United States Patent [19]

Sekido et al.

[11] Patent Number: 4,965,899
[45] Date of Patent: Oct. 30, 1990

[54] AIR CUSHION FOR CHAIR AND CHAIR UTILIZING THE AIR CUSHION

[75] Inventors: Hiroshi Sekido, Chiba; Toshimichi Hioki, Gifu, both of Japan

[73] Assignee: Okamoto Industries, Inc., Tokyo, Japan

[21] Appl. No.: 338,560

[22] Filed: Apr. 14, 1989

Related U.S. Application Data

[63] Continuation of Ser. No. 41,132, filed as PCT JP86/00524 on Oct. 15, 1986, published as WO87/02230 on Apr. 23, 1987, abandoned.

[30] Foreign Application Priority Data

Oct. 15, 1985 [JP] Japan ................ 60-230600
Nov. 20, 1985 [JP] Japan ................ 60-179392
Nov. 20, 1985 [JP] Japan ................ 60-179393
Jun. 28, 1986 [JP] Japan ................ 61-99312
Jul. 16, 1986 [JP] Japan ................ 61-168939

[51] Int. Cl.$^5$ ............................................ A47C 27/08
[52] U.S. Cl. ........................................ 5/453; 5/455; 5/457; 297/284; 297/DIG. 3
[58] Field of Search ............ 5/499, 450, 453, 455–457, 5/481; 297/284, DIG. 3; 428/264

[56] References Cited

U.S. PATENT DOCUMENTS

| 1,371,919 | 3/1921 | Mahony | 5/455 X |
| 3,298,044 | 1/1967 | Saltness et al. | 5/455 X |
| 3,326,601 | 6/1967 | Vanderbilt et al. | 5/453 |
| 3,330,598 | 7/1967 | Whiteside | 5/453 X |
| 3,392,412 | 7/1968 | Aymar | 5/453 X |
| 3,503,084 | 3/1970 | Meinwieser | 5/457 |
| 3,705,429 | 12/1972 | Nail | 5/457 |
| 3,864,766 | 2/1975 | Prete, Jr. | 5/450 |
| 4,233,102 | 11/1980 | Fisher | 5/449 X |
| 4,415,203 | 11/1983 | Cawley | 297/DIG. 3 |
| 4,444,430 | 4/1984 | Yoshida et al. | 297/284 |
| 4,589,695 | 5/1986 | Isono | 297/DIG. 3 |
| 4,592,589 | 6/1986 | Hellwig | 297/284 |
| 4,690,456 | 9/1987 | Chiba et al. | 297/284 |
| 4,821,354 | 4/1989 | Little | 5/455 X |

FOREIGN PATENT DOCUMENTS 1195549 11/1959 France ................ 5/457
205230 12/1982 Japan ................ 297/284

Primary Examiner—Michael F. Trettel

[57] ABSTRACT

A vehicle seat assembly is provided having a inflatable bag positioned within its seat cushion. The bag comprises first and second fabric members joined by a rib fabric member. Each first and second member is a laminate consisting of a meshed middle fabric sandwiched between two thermoplastic resin layers adhered to one another via the meshes. Only the outer peripheries of the two resin layers are in direct sealing contact with one another. An air port is sealingly connected to the first or second member to allow air to be supplied or removed from the bag to change its contour.

26 Claims, 33 Drawing Sheets

AIR CUSHION FOR CHAIR AND CHAIR UTILIZING THE AIR CUSHION

This application is a continuation of application Ser. No. 041,132 filed as Pct JP86/00524 on Oct. 15, 1986, published as WO087/02230 on Apr. 23, 1987, now abandoned.

BACKGROUND OF THE INVENTION

1. Technical Field of the Invention

This invention relates to an inflatable air support device for a chair, and more particularly to an improvement of the air support to be used in an automobile and the improved air support.

2. Discussion of the Related Art

This kind of conventional air support is a mere air bag and there is a major trend to use this air bag such that air is fed into or discharged from it to expand or retract the air bag.

Therefore, no air bag was found in which only one air support could fit the body of the user. Even in case that the above-mentioned air support was stored in the seat cushion or seat back, the air support was merely stored in it, so that even if air was poured into the bag, the surface of the seat cushion or seat back merely showed a bulging action, and this type did not fit to the body of the user and so it showed some disadvantages that some effect of holding of the seated person and removing a feeling of fatigue could not sufficiently be attained.

This invention is one in which the abovementioned disadvantages of the prior art are eliminated for its object.

SUMMARY OF THE INVENTION

According to a first invention, there is provided an inflatable air support device for a chair comprising a suspension fabric is arranged between the upper opposed surface and the lower opposed surface or the side fabric in the main body of the expandable air bag, said surfaces being formed into a rugged configuration. With this, it is possible to provide a chair having a fitness by the provision of the rugged configuration in the surfaces unlike the conventional air bag. According to a second invention, there is provided an air support for chair characterized in that the main body of the expandable air bag and part of or the whole suspension in the first invention are formed of tarpaulin. Therefore, as compared with the first invention, even if the force more than as needed is applied to the main body of the air bag and the suspension fabric, they are not deformed and in addition have the strengthening property, thus increasing the durability.

According to a third invention, there is provided an air support for chair in which permeable urethane foam is inserted into the main body of the air support for chair according to the first invention. Therefore, as compared with the first invention, an air feed and discharge device is not always required, and a highly useful air support for chair may be obtained.

According to a fourth invention, there is provided an air support for chair in which in the main body of the air support for chair according to the first invention, the main body of the expandable air bag and part of or the whole suspension fabric are formed of tarpaulin to constitute the body of the air support, and permeable urethane foam is inserted into the main body of the air support. An air feed and discharge device is not always needed while possessing the configuration retaining property, and a further improvement is applied to the first invention.

According to a fifth invention, there is provided a chair utilizing the air support characterized in that the air support body for chair according to the first to fourth inventions is sealed into one or both seat cushion and a seat back, which is the invention showing the utilizing place of the first to fourth inventions. This fifth invention clearly shows that the utilization of the seat cushion or seat back or both of them for the chair is useful.

There is further provided a method for manufacturing a chair with an air support characterized by the steps of putting the air support for chair according to the first to fourth inventions into the central portion in the mold for the seat cushion or seat back, filling the whole periphery of the air support for chair with a liquid of expandable foaming material, and thereafter solidifying said liquid to remove it from the mold, thus forming the seat cushion or seat back. This is the best method for manufacturing a chair utilizing the air support according to the first to fourth inventions.

Next, a seventh invention provides a chair utilizing an air support which comprises:

i. Air pump for supplying air, ii. an expandable member encased in position of a vehicle seat to supply and discharge the air supplied by said air pump, iii. a support plate provided along a predetermined part in the back of a surface layer member constituting a surface portion of the vehicle seat, said support plate being moved in and out f the seat surface by the expansion of said expandable member, which elements i, ii and iii above constitute a seat support device for the vehicle seat, and iv. said expandable member comprising two sheets whose peripheral edges are sealed to form an air bag body, a plurality of such air bag bodies being placed one above another, predetermined points of a contact surface between the air bag bodies adjacent to each other being joined, and said joined portions being formed with vent holes to provide a communication between the air chambers of the air bag bodies. This invention improves over the utilizing means in connection with the first to fourth inventions, providing an expansion property in the surface of the chair with planar positiveness.

BRIEF DESCRIPTION OF THE DRAWINGS

FIGS. 1 to 3 show the first embodiment using one sheet of suspension fabric, FIGS. 4 to 6 show the second embodiment using plural sheets of suspension fabric, FIG. 7 and FIG. 8 show the third embodiment using plural sheets of fabric with the surfaces in rugged state, FIG. 9 and FIG. 10 show the fourth embodiment using plural sheets of suspension fabric in the same way as that shown in FIG. 8 with their surfaces in wavy form, FIG. 11 and FIG. 12 show the fifth embodiment displaying the state for forming an independent air chamber by means of plural sheets of suspension fabric, FIGS. 13 to 15 show an embodiment for using partially provided hollow passage and FIGS. 16 to 22 show the seventh embodiment displaying a car for using suspension fabric by means of a tube body. Meanwhile.

FIG. 34 is a partly cutaway perspective view showing an air bag which utilizes tarpaulin of the present invention; FIG. 35 is a sectional view of the same; FIG. 36 is a partly cutaway perspective view showing a molding sheet for forming an air bag; FIG. 37 is a longitudinal sectional view of the same; FIG. 38 is a partly cutaway perspective view showing an air bag whose peripheral edge is devised while utilizing the tarpaulin in the present invention; FIG. 39 is a longitudinal sectional view of the same; FIG. 40 is a partly cutaway perspective view showing a molding sheet for forming the air bag shown in FIG. 38; FIG. 41 is a longitudinal sectional view of the same; FIG. 42 is a partly cutaway perspective view showing an air bag whose peripheral edge portion is further improved; FIG. 43 is a longitudinal sectional view of the same; FIG. 44 is a partly cutaway perspective view showing a molding sheet for forming the air bag shown in FIG. 42; and FIG. 45 is a longitudinal sectional view of the same.

FIGS. 60 to 69 show one embodiment according to the seventh invention in which: FIG. 60 is a partly cutaway perspective view showing the interior of a vehicle seat equipped with an air support device to which the present invention is embodied; FIG. 61 is a sectional view taken on line X—X of FIG. 60; FIG. 62 is a sectional view taken on line Y—Y of FIG. 60; FIG. 63 is a sectional view taken on line Z—Z of FIG. 60; FIG. 64 is an enlarged view of part W of FIG. 63; FIG. 65 is a partly cutaway view showing an expandable member of a side support portion; FIG. 66 is a partly cutaway perspective view showing an expandable member of a side support portion on the back rest side; FIG. 67 is a partly cutaway perspective view showing an expandable member of a side support portion on the seat side; FIG. 68 is a partly cutaway perspective view showing a molding sheet cut into a rectangular shape; and FIG. 69 is a sectional view of the molding sheet.

Figure 1:
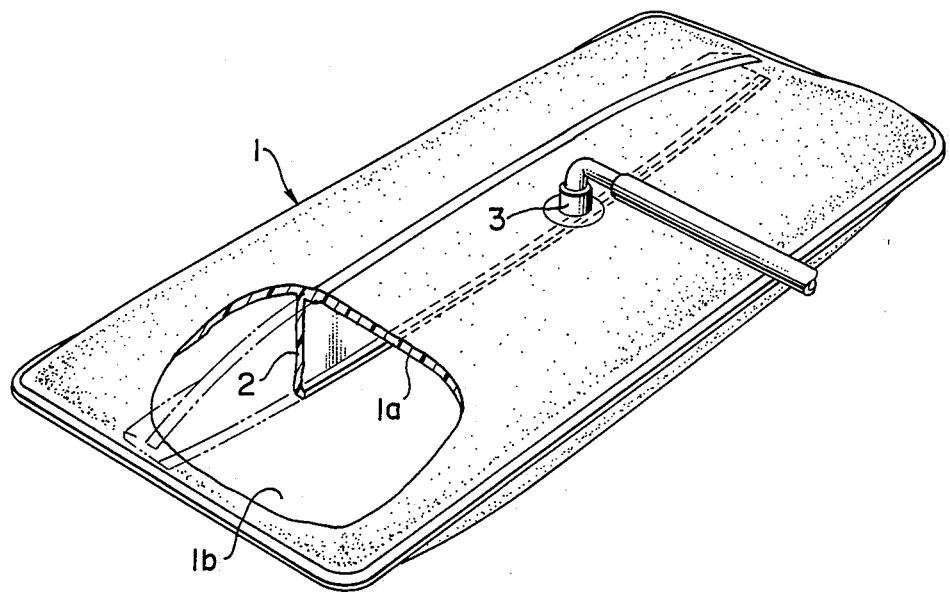
FIGS. 1 to 22 show preferred embodiments utilizing the air support for chair according to the present invention.
Figure 2:
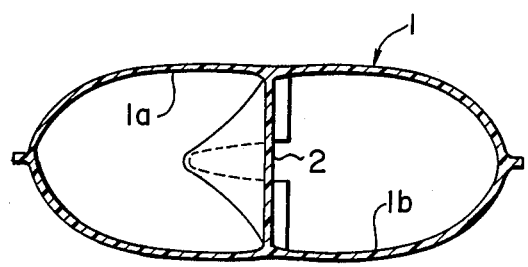

DETAILED DESCRIPTION OF THE INVENTION (Best Mode for Embodying the Invention)

Referring now to the drawings, some preferred embodiments of the present invention will be described.

(Embodiments)

In the first preferred embodiment, it is constructed such that a rectangular suspension fabric (2) is arranged between the upper opposed surface (1a) and the lower opposed surface (1b) in the main body (1) of the air bag and the suspension fabric (2) is applied for making a rectangular cross section when the main body (1) of the air bag is expanded. The main body (1) of the air bag is formed to show a planar rectangular shape by overlapping two sheets of thermoplastic soft urethane resin and thermally heating an entire circumference of the sheets and an air feeding and discharging port (3) to be connected to a pump (not shown) is provided at one of the front and rear surfaces.

Figure 3:
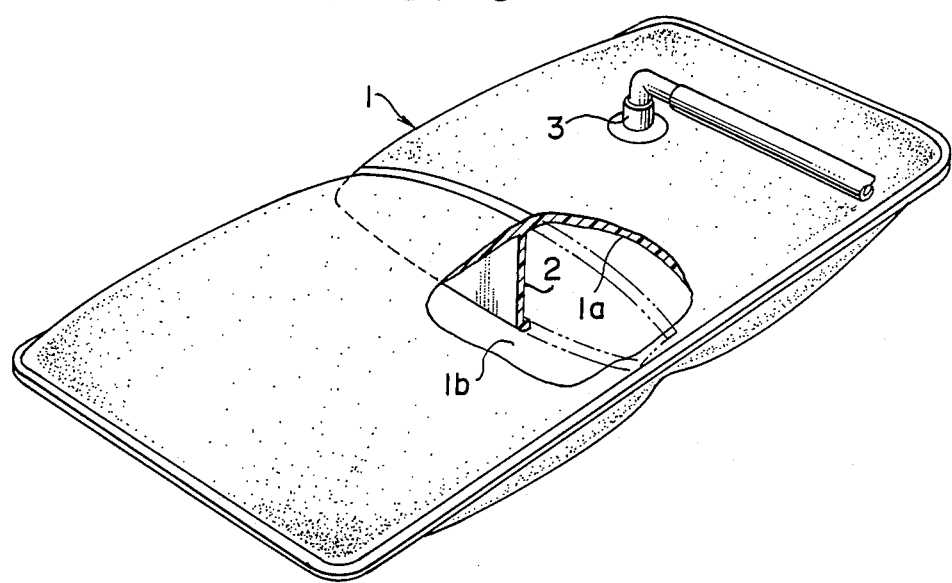

The suspension fabric (2) is of the same material quality as that of the main body (1) of the air bag, and one sheet of fabric is placed on a center line of a longitudinal side in the main body (1) of the air bag as shown in FIG. 1 or one sheet of fabric is placed on the center line of a short side in the main body (1) as shown in FIG. 3, and the upper and lower longitudinal sides are thermally melted to the upper opposed surface (1a) and the lower opposed surface (1b) in the main body (1), respectively. The length of the suspension fabric (2) is slightly shorter than either a longer side or a shorter side of the main body (1) of the air bag, and therefore an air chamber in the main body (1) is maintained in a unitary form without being separated by the suspension fabric (2). The suspension fabric (2) could be used in its tubular form.

Figure 13:
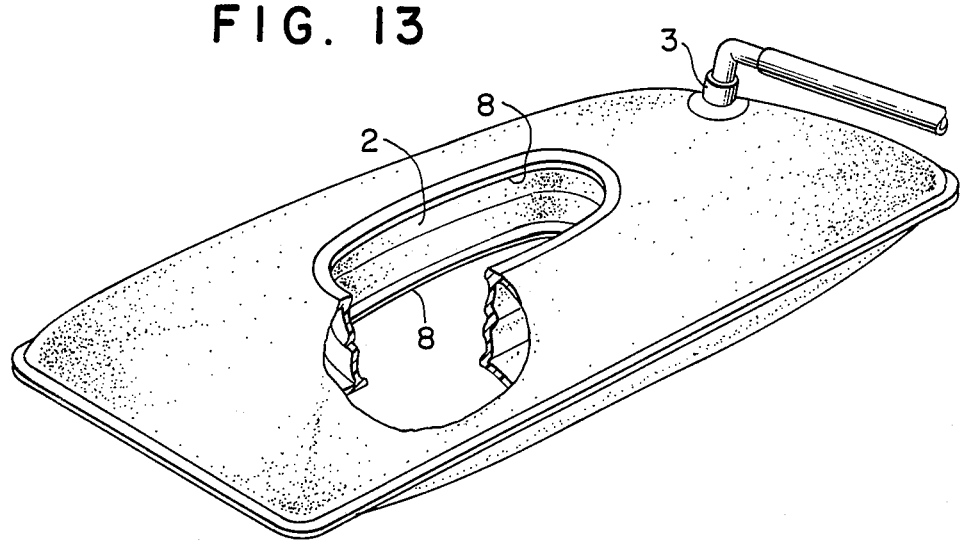
Figure 14:
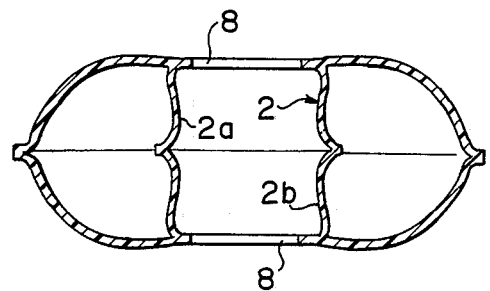
Figure 15:
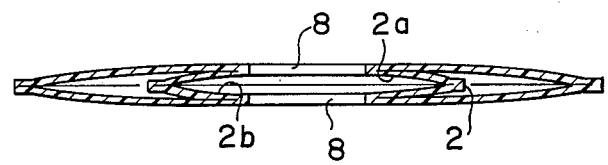
Figure 32:
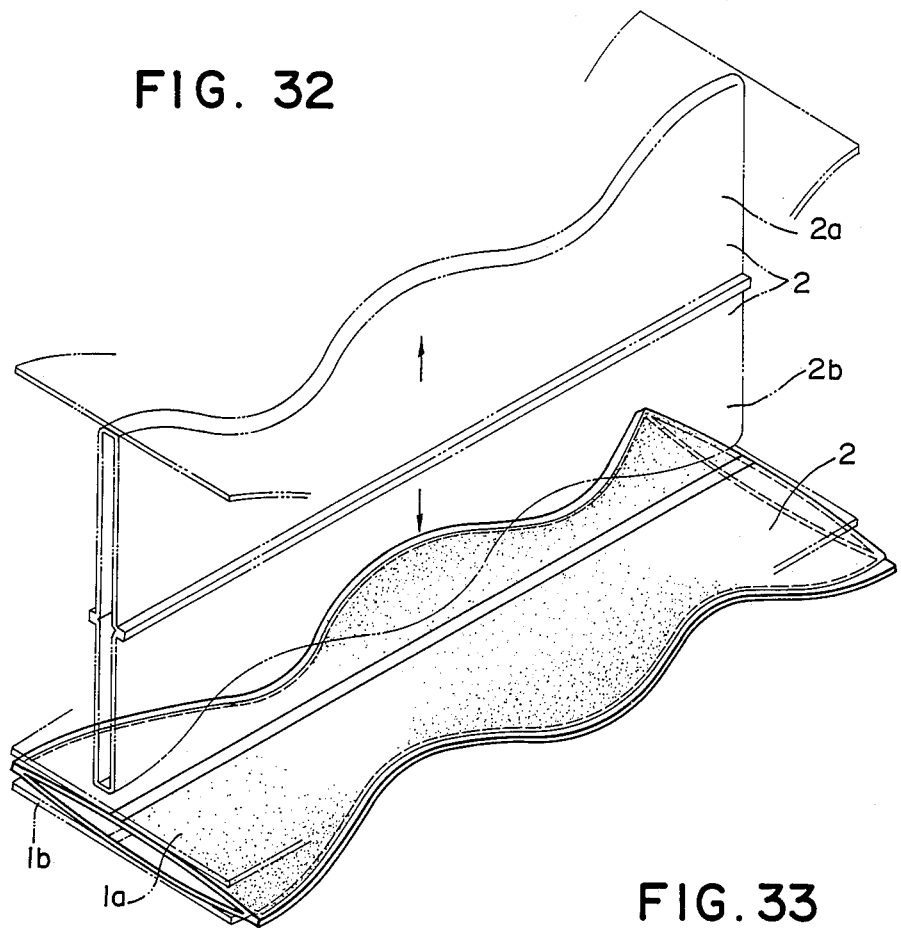
Figure 33:
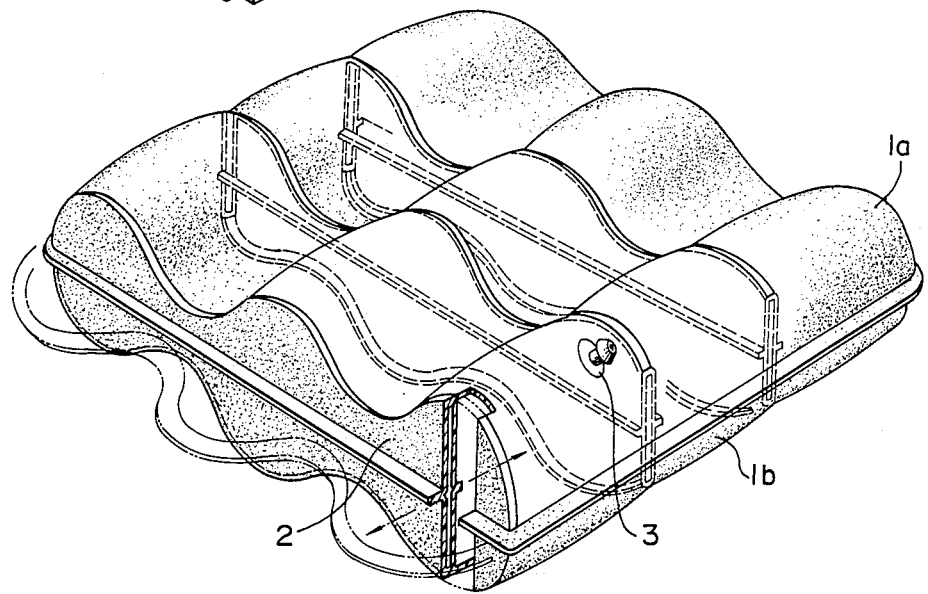

Further, referring to FIGS. 13, 14 and 15, a more detailed description shows that in order to facilitate a folding of the air bag, the suspension fabric (2) may be made such that two sheets of base fabrics are overlapped to each other and one side part is adhered and they are applied with a permanent line to overlap at their center points. And, referring to FIGS. 32 and 33, it may also be possible to overlap two sheets of fabrics, to adhere both sides of the fabrics to form a tubular shape, and the upper and lower central portions are adhered to the upper opposed surface (1a) and the lower opposed surface (1b), respectively.

The air bag of the first preferred embodiment as described above is operated such that when the air is supplied to the main body (1) of the air bag through a feeding and discharging port (3), the main body (1) is expanded while the clearance between the upper opposed surface (1a) and the lower opposed surface (1b) is kept constant by the suspension fabric (2), the cross sectional shape in case of bulged main body (1) is kept as a rectangular form and then the front and rear surfaces of the main body become flat.

In the first preferred embodiment, the suspension fabric is applied as one fabric but as shown in FIGS. 4 to 12, 31 and 33, a plurality of suspension fabrics, for example, two to three suspension fabrics may also be arranged in parallel. In this way, if a plurality of suspension fabrics are arranged, an effect of holding shape of the main body of the air bag may be increased, the cross sectional shape of the main body can be made more approximate to a rectangular shape and then the surface of the main body can positively be a flat surface.

Figure 4:
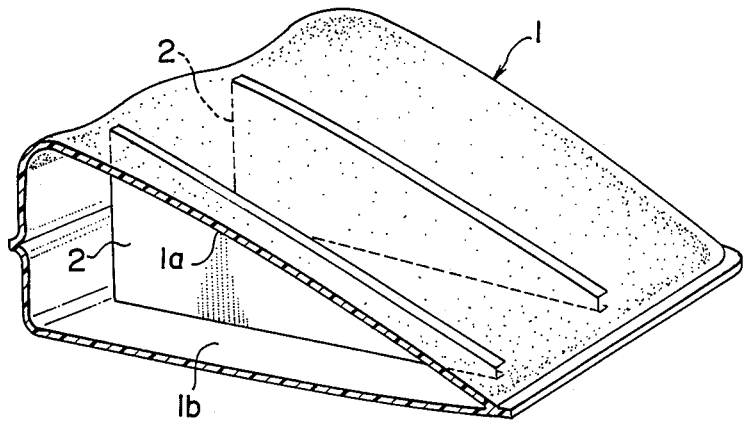
Figure 5:
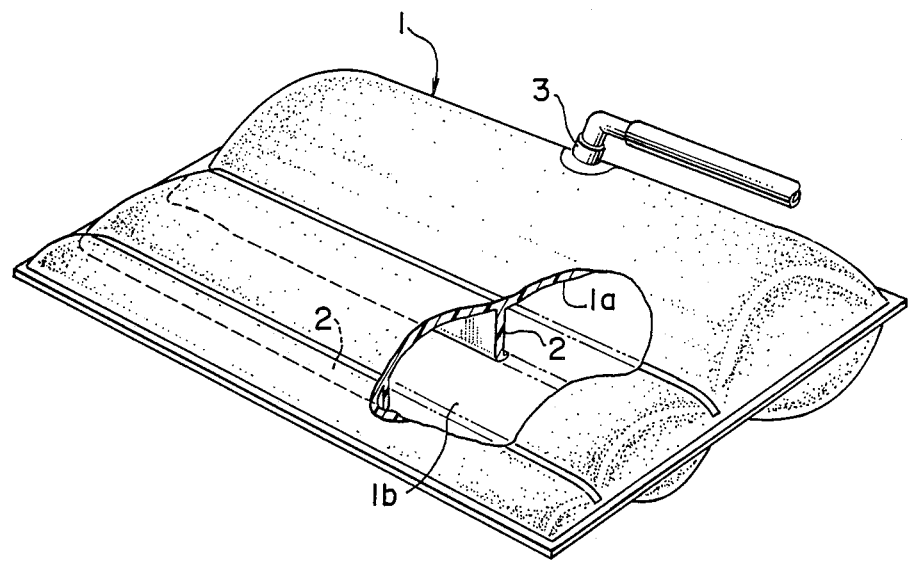
Figure 6:
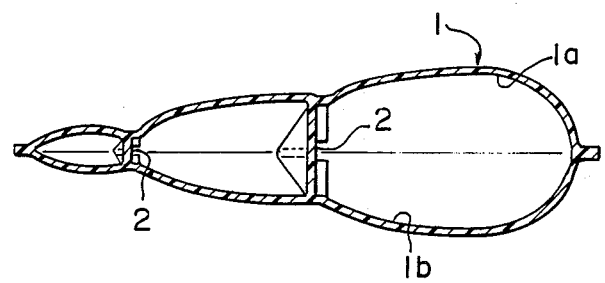

In the second preferred embodiment, as shown in FIG. 4, the suspension fabric (2) arranged at the upper opposed surface (1a) and the lower opposed surface (1b) in the main body (1) of the air bag is formed as a triangular shape or as shown in FIGS. 5 and 6, a plurality of, for example, two rectangular suspension fabrics (2) are arranged so as to divide unevenly the main body (1) in a direction of short side or long side and the height of each of the suspension fabrics (2) is gradually increased in their parallel direction. In case that the triangular suspension fabric (2) is to be installed, the number of fabrics may be either one or a plurality of fabrics. In case that one suspension fabric (2) is applied, the suspension fabric (2) is arranged on the center line of the short side or long side of the main body (1) of the air bag and in case of a plurality of suspension fabrics, it is preferable to arrange each of the suspension fabrics so as to make an equal division of the main body (1) of the air bag in its short side or long side direction in such a way as it may make an effect of holding of uniform shape.

The second preferred embodiment as described above is operated such that when the main body (1) of the air bag is expanded, a clearance between the upper opposed surface (1a) and the lower opposed surface (1b) is gradually increased by the suspension fabric (2) or (2) in its short side or long side direction, the cross sectional shape of the main body (1) of the air bag becomes a triangular shape and then the surface of the main body becomes an inclined or slant surface.

Figure 7:
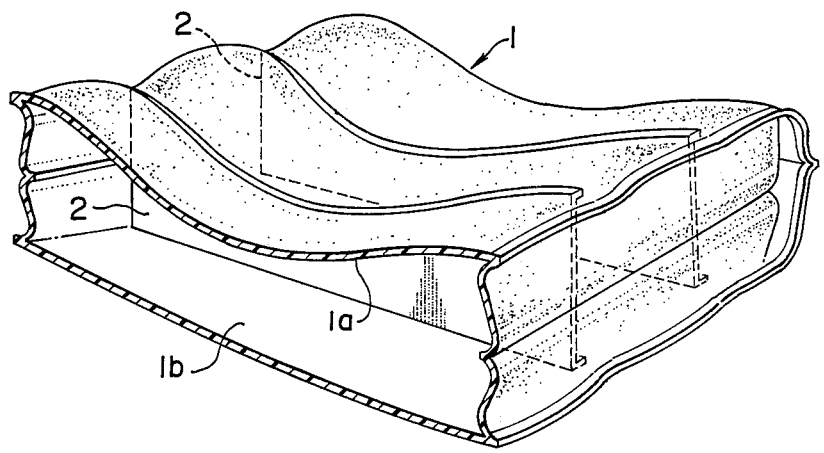
Figure 8:
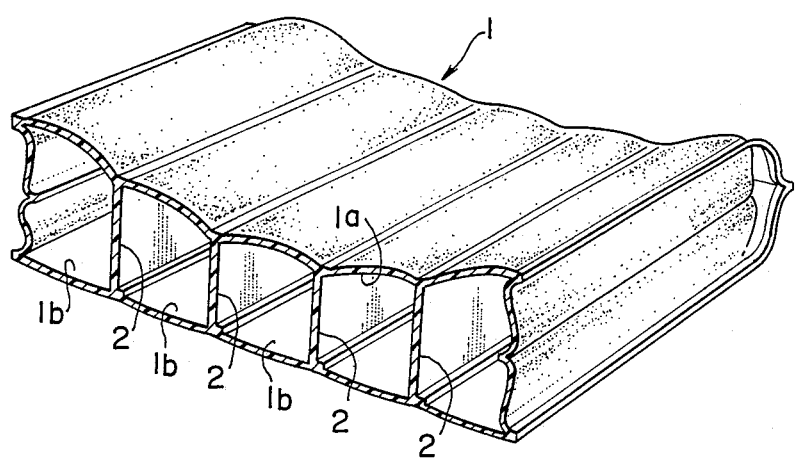

The third preferred embodiment is constructed such that as shown in FIG. 7, the suspension fabric (2) has an arcular side recessed from one rectangular longitudinal side, a plurality of, for example, two suspension fabrics (2) are arranged in parallel in a direction of short side or longitudinal side of the main body (1) of the air bag, or a plurality of, for example, four rectangular suspension fabrics (2) are arranged in a direction of short side or longitudinal side so as to divide the main body (1) of the air bag as shown in FIG. 8, and the height of each of the suspension fabrics (2) has a higher one at its outer side and a lower one at its inner side, respectively.

The third preferred embodiment as described above is operated such that when the main body (1) of the air bag is expanded, a clearance between the upper opposed surface (1a) and the lower opposed surface (1b) is varied in a quadratic curve fashion with the suspension fabric (2) or a plurality of suspension fabrics (2), the cross sectional shape of the main body (1) of the air bag becomes such a shape as one rectangular longitudinal side being concaved to an arcular shape, resulting in that the entire surface becomes a concave surface.

Figure 9:
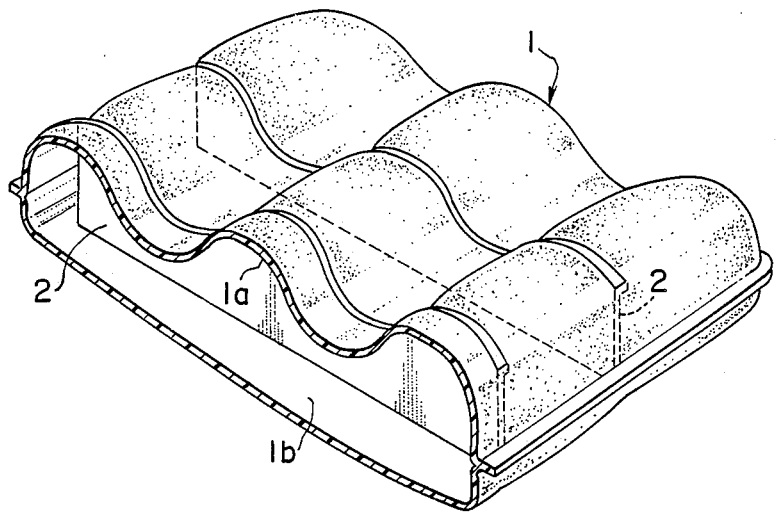
Figure 10:
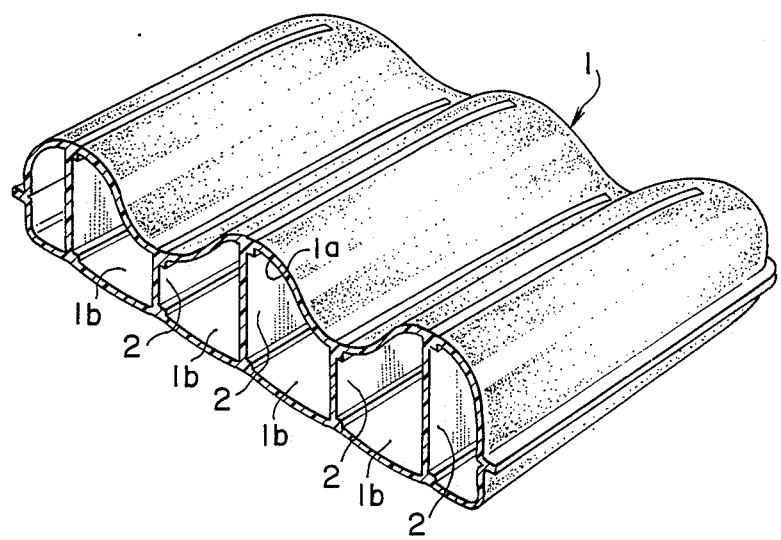

The fourth preferred embodiment is constructed such that as shown in FIG. 9 the suspension fabrics (2) are of such a shape as having longitudinal sides of rectangular shape recessed to show a sine curve, the above-mentioned suspension fabrics (2) are arranged such that a plurality of suspension fabrics, for example, three fabrics are arranged in parallel in a direction of short side or longitudinal side of the main body (1) of the air bag, or as shown in FIG. 10, a plurality of, for example, five rectangular suspension fabrics (2) are arranged in such a way as the main body (1) of the air bag is equally divided in a direction of short side or longitudinal side, the height of each of the suspension fabrics (2) is made higher at its intermediate one and both outer ones and the suspension fabric held between them is made lower one.

The fourth embodiment as described above is constructed such that when the main body (1) of the air bag is expanded, it is held in such a way as a clearance between the upper opposed surface (1a) and the lower opposed surface (1b) is varied in a sine curve fashion with the suspension fabric (2) or a plurality of suspension fabrics (2) and then the cross sectional shape of the main body (1) of the air bag becomes one in which one rectangular longitudinal side has a sine curved shape and the surface of the main body becomes a curved surface having a raised part and a concave part.

The preferred embodiment of the suspension fabric (2) could be utilized as shown in FIGS. 30 and 31, or FIGS. 32 and 33. With this arrangement, it is possible to facilitate a provision of the corrugated surfaces on the upper opposed surface (1a) and the lower opposed surface (1b), resulting in making a smooth fit to a human body.

Figure 11:
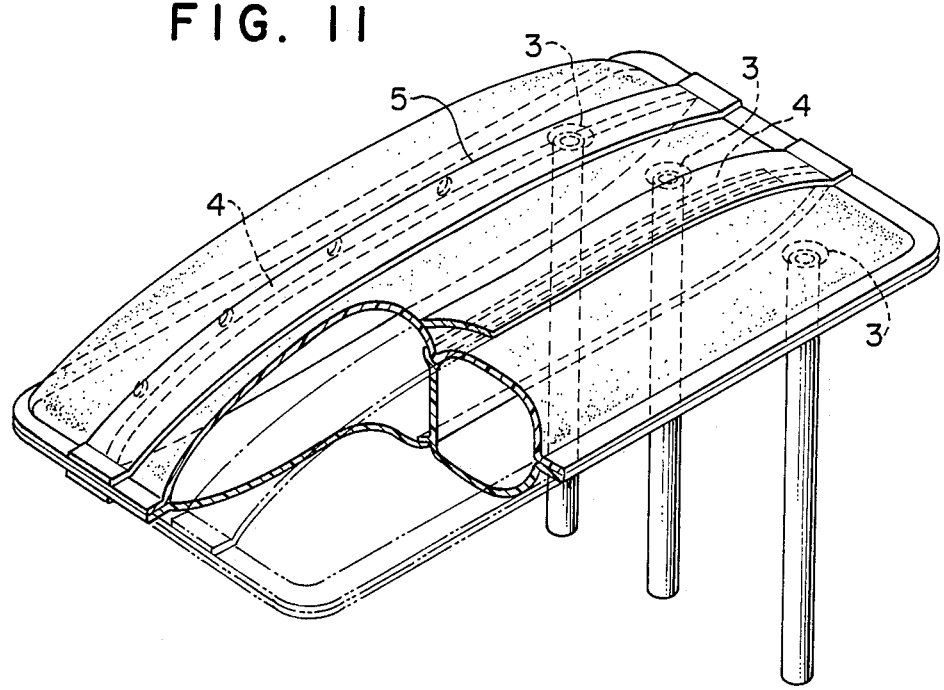
Figure 12:
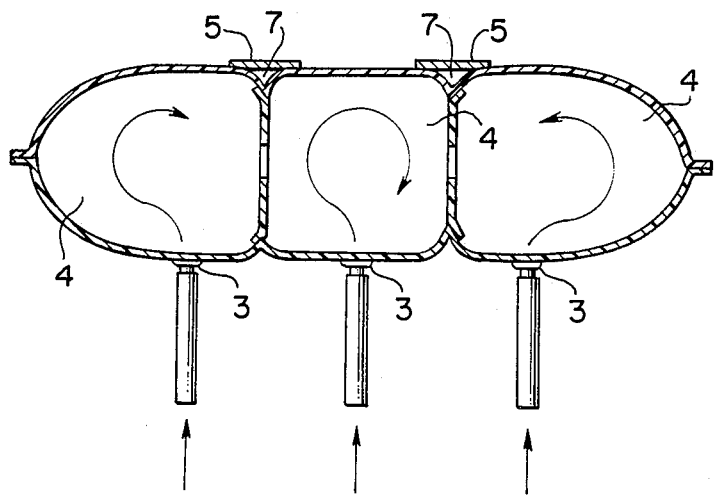

Further, as shown in FIGS. 11 and 12, the main body (1) of the air bag is provided with a rectangular suspension fabric (2) over a clearance between the inner opposed surfaces (1a) and (1b) and further with an air feeding and discharging port (3) to be connected to a pump (not shown) at its rear surface.

The suspension fabrics (2) are of the same material quality as that of the main body (1) of the air bag, they are arranged in parallel in a properly spaced-apart relation in circumferential direction of the main body (1) and each of the upper and lower edges is welded to the upper opposed surface (1a) and the lower opposed surface (1b) in the main body (1). The length of the suspension fabrics (2) is slightly shorter than the longitudinal side of the main body (1) of the air bag and therefore the air chamber in the main body (1) of the air bag is partitioned by the suspension fabrics (2) to constitute the sub-air chambers (4). The length of the suspension fabrics (2) may correspond to the length of the longitudinal side of the main body (1) of the air bag.

The sub-air chambers (7) are made such that some belt-like sheets (5) cut to the desired width are arranged over the entire length of the above-mentioned thermal melted part and its entire circumferential edges are melted and adhered to the surface of the main body (1).

The above-mentioned belt-like sheets (5) are applied in tension over a space between the portions starting a concave part at both sides of groove-like concave part which is formed along the supporting locations for the suspension fabrics (2) of the surface of the main body, and the widths of the above-mentioned belt-like sheets (5) and the small sub-air chambers (7) are defined in response to the width of the above-noted groove-like concave portions.

The surface of the main body (1) of the air bag in the small sub-air chambers (7) is provided with some communication holes (6) so as to communicate the interior of the main body (1) with the small sub-air chambers (7).

The main body (1) of the air bag in the above-mentioned preferred embodiment is operated such that when air is supplied through feeding and discharging ports (3) of the inner plugs, the opposed inner surfaces of the main body (1) are expanded with a specified clearance being kept by the suspension fabrics (2), their cross sectional shapes are kept in a rectangular form, sub-air chambers (4) may be independently formed or communicated to each other. In this case, some groove-like concave portions are formed along the supports at the edges of the suspension fabrics (2) at the surfaces of the main body (1) of the air bag and the concave portions are hidden by being covered by belt-like sheets (5) by a method wherein the small subchambers (7) arranged along the concave portions are expanded together with the main body (1).

In the above-mentioned preferred embodiment, it is optional that the number of suspension fabrics (2) is decreased down to one suspension fabric or increased up to three to four fabrics and they may be arranged in a direction of the short side of the main body (1) of the air bag, and also in this case the small sub-air chambers (7) are arranged at the supporting parts for each of the suspension fabrics (2) at the surface of the main body (1) of the air bag and thus the surface of the main body (1) is kept flat.

In addition, as shown in FIGS. 13 and 14, each of the upper opposed surface (1a) and the lower opposed surface (1b) of the main body (1) of the air bag is provided with openings (8), and the suspension fabrics (2) are arranged over the circumferential edges of these openings (8).

The main body (1) of the air bag is constructed such that two sheets of thermoplastic soft urethane resin are overlapped to each other and the entire circumferences of the sheets are thermally melted and adhered to each other to form a planar rectangular shape, and one of the upper opposed surface (1a) or the lower opposed surface (1b) is provided with an air feeding and discharging port (3) to be connected to the pump (not shown).

Each of the openings (8) arranged in the above-noted upper opposed surface (1a) and the lower opposed surface (1b) is of an ellipse o circle having the same diameter, is positioned at the central portions of the upper opposed surface (1a) and the lower opposed surface (1b) and has a relatively large opening area.

The suspension fabrics (2) are of the same material quality as that of the main body (1) of the air bag, two endless belt fabrics (2a) and (2b) are thermally melted and adhered to each other to form a gusset and constructed in such a way as they may be folded, and the upper and the lower circumferential edges are thermally melted and adhered to the circumferential edges of the openings.

The main body (1) of the air bag of the preferred embodiment as described above is operated such that air is fed from the feeding and discharging port (3) to expand the main body (1), resulting in that a clearance between the circumferential edges of the openings (8) of the upper opposed surface (1a) and the lower opposed surface (1b) on the sheet is uniformly kept by the suspension fabrics (2), the clearance holding action is extended up to the upper opposed surface (1a) and the lower opposed surface (1b) around the openings (8) and then the clearance between the upper opposed surface (1a) and the lower opposed surface (1b) is kept uniform. Under such a condition as the main body (1) of the air bag is expanded, each of the surfaces (1a) and (1b) is flat. In case that the main body (1) of the air bag is retracted, as shown in FIG. 13, the suspension fabrics (2) are folded into the main body (1) of the air bag by their gusset structures. FIG. 15 illustrates the retracted condition of the preferred embodiment shown in FIG. 13.

The preferred embodiment of the present invention will be further described in reference to the drawings.

Figure 16:
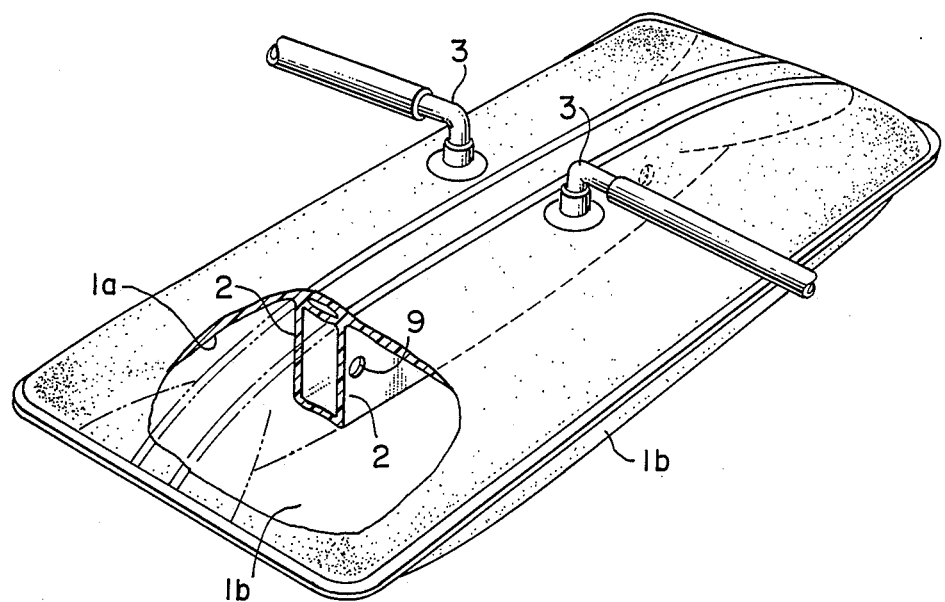
Figure 17:
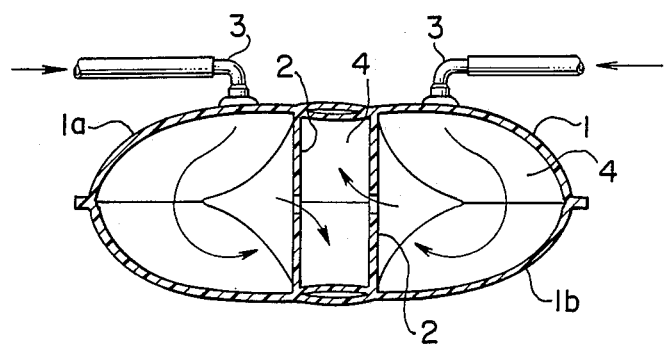

The main body (1) of the air bag is constructed such that as shown in FIGS. 16 and 17, a tubular suspension fabric (2) is arranged over a clearance between the inner opposed upper surface (1a) and the lower opposed surface (1b).

The main body (1) of the air bag is formed such that transparent front and rear sheets of thermoplastic soft urethane resin are overlapped to each other, then the suspension fabric (2) is thermally melted and adhered to the desired locations at the opposed surfaces of both sheets, thereafter the entire circumferential edges of both sheets are thermally melted and adhered to each other to form a planar rectangular shape.

The above-noted suspension fabric (2) is formed to a tubular shape with the same material quality as that of the main body (1) of the air bag, is extended in a direction of longitudinal side at the central part between the upper opposed surface (1a) and the lower opposed surface (1b) of the main body (1) of the air bag, two locations of the uppermost part and the lowermost part acting as the contacted portions between the above-noted opposed surfaces (1a) and (1b) at the circumferential surface of the suspension fabric (2) are thermally melted and adhered with a specified width to the upper opposed surface (1a) and the lower opposed surface (1b) and fixed thereto.

Figure 18:
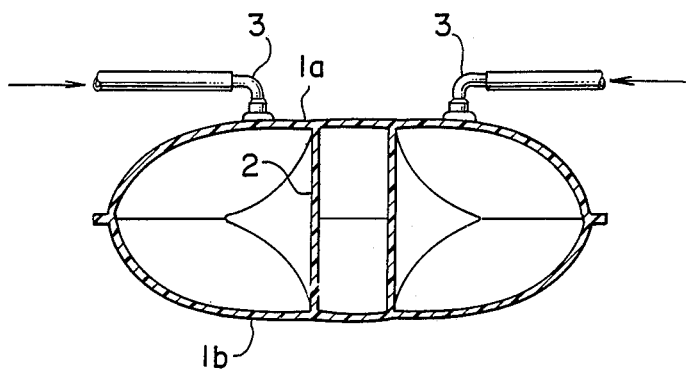

As described above, in order to fix the uppermost part and the lowermost part at the circumferential surface of the suspension fabric (2) to the upper opposed surface (1a) and the lower opposed surface (1b) with a specified width, as shown in FIGS. 16 and 17, two locations at both sides of the fixed width at the circumferential surface of the suspension fabric (2) are thermally melted and adhered in a linear form over the entire length of the suspension fabric (2) or as shown in FIG. 18 the entire surface of the fixed width of the circumferential surface of the suspension fabric (2) is thermally melted and adhered.

A process for thermally melting and adhering the suspension fabric (2) to the upper opposed surface (1a) and the lower opposed surface (1b) in a practical manner will be described in reference to FIGS. 19 to 22.

Figure 19:
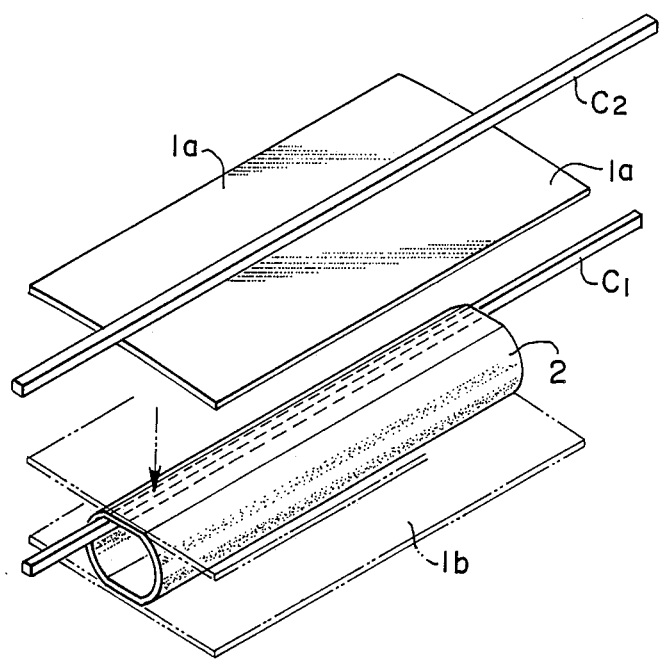
Figure 20:
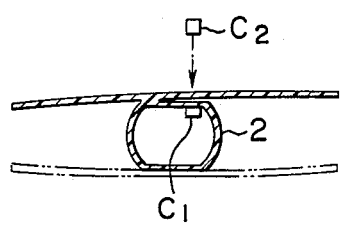
Figure 21:
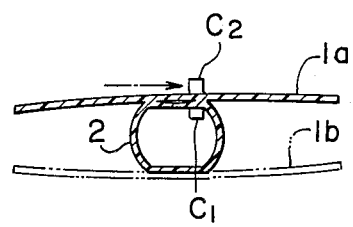

As shown in FIG. 19, the suspension fabric (2) is inserted and fitted to a rod-like lower electrode ($C_1$), the sheet-like upper opposed surface (1a) is placed on the suspension fabric (2) to set its position, then an upper electrode ($C_2$) is forcedly contacted onto the sheet-like upper opposed surface (1a) to hold the uppermost part of the suspension fabric (2) and the sheet-like upper opposed surface (1a) together with the lower electrode ($C_1$), then both electrodes ($C_1$) and ($C_2$) are energized to perform a thermal melting and adhesion. Then, the position where the lower electrode ($C_1$) is applied is displaced by a distance corresponding to the desired fixed width in a circumferential direction of the suspension fabric (2) as shown in FIG. 20, and both the suspension fabric (2) and the sheet-like upper opposed surface (1a) are held by both electrodes ($C_1$) and ($C_2$), thereafter they are thermally melted and adhered as shown in FIG. 21.

As described above, the suspension fabric (2) and the sheet-like upper opposed surface (1a) are thermally melted and adhered, thereafter the suspension fabric (2) is rotated by a half distance while it is inserted into the lower electrode ($C_1$), the circumferential surface of the suspension fabric (2) which is just opposite to the fixed part of the suspension fabric (2) thermally melted and adhered as described above is faced upward, the surface part is thermally melted and adhered to the fixed position of the sheet-like lower opposed surface (1b) in the same manner as that of the sheet-like upper opposed surface (1a), and then the suspension fabric (2) is applied over both upper and lower opposed surfaces (1a) and (1b).

Since the suspension fabric (2) is of a tubular form, if it is inserted into the rod-like lower electrode ($C_1$), the forcedly contacted surface of the electrode ($C_1$) is held automatically while it is contacted with the inner uppermost surface of the suspension fabric (2), resulting in that an operation for setting the melted and adhered part of the suspension fabric (2) to the lower electrode ($C_1$) and the operation for holding it under such a condition as above may be eliminated and then the sheet-like upper opposed surface (1a) is fixedly held manually on the suspension fabric (2) held under the above-mentioned condition, held by the upper electrode ($C_2$) and the sheet may be thermally melted and adhered in a simple and easy operation by energizing the upper and lower electrodes ($C_1$) and ($C_2$).

Both upper and lower opposed surfaces (1a) and (1b) having the suspension fabric (2) thermally melted and adhered form the planar rectangular main body (1) of the air bag by a thermal melting and adhering of the entire circumferential edges with each other and further a feeding and discharging port (3) is arranged at the rear surface of the main body (1). In this case, both ends of the suspension fabric (2) are held between the upper and lower opposed surfaces (1a) and (1b) to make an integral thermal melting and adhering.

Figure 22:
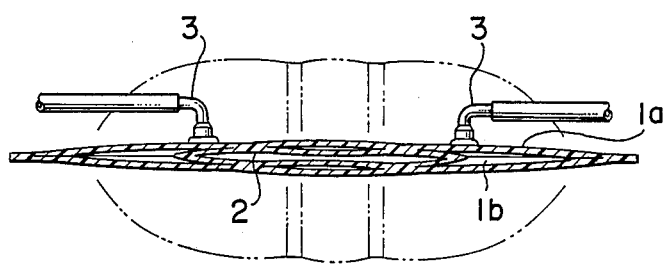

With this arrangement, the suspension fabric (2) is held such that its both ends are collapsed in a direction of shrinkage of the main body (1) of the air bag and the entire suspension bag (2) is collapsed flat. Thus, when the main body (1) of the air bag is shrinked, the suspension fabric (2) is lightly collapsed together with the main body (1) of the air bag and no useless projections are generated at the surface of the main body (1) as shown in FIG. 22.

Both upper and lower suspension fabrics (2a) and (2b) holding the upper and lower fixed parts at the circumferential surface of the suspension fabric (2) are tensioned in an expanding direction with a tension force of the main body (1) of the air bag and are deformed to show a rectangular cross section as shown in FIG. 17. Thus, air through-pass holes (9) are made at the circumferential surface of the suspension fabric (2) so as to cause the air in the main body (1) of the air bag to be flowed freely, a deformation of the suspension fabric (2) is freely made and at the same time the small sub-chambers (4) are made independent one.

A permanent folding line is applied in advance at the circumferential folding part in the suspension fabric (2) to cause the suspension fabric (2) to be easily collapsed, the length of the suspension fabric (2) is made slightly shorter than the long side of the main body (1) of the air bag, the air chamber in the main body (1) of the air bag is kept in a unitary form without being partitioned by the suspension fabric (2). In this case, the suspension fabric (2) may not be provided with the through-pass holes (9).

The main body (1) of the air bag in the preferred embodiment as described above is operated such that both upper and lower suspension fabrics (2a) and (2b) are tensioned in a tensile direction upon feeding of air through the feeding and discharging port (3) and the clearance between the upper opposed surface (1a) and the lower opposed surface (1b) of the main body (1) of the air bag is kept uniformly. At this time, since both side surfaces of the suspension fabric (2) are tensioned with each other with a distance of the fixed width, it may show the same holding effect as that obtained in the case that two suspension fabrics are arranged in parallel with the above-noted distance, the upper opposed surface (1a) and the lower opposed surface (1b) of the main body (1) of the air bag are uniformly held at two points, their cross sectional shapes are held more accurately than that of a piece of suspension fabric, and both front and rear surfaces of the main body (1) of the air bag are formed to an approximate planar flat surface.

It is of course optional that in the above-mentioned preferred embodiment, the number of suspension fabrics is several, for example, two to three, and these suspension fabrics are arranged side-by-side in a direction of short side of the main body (1) of the air bag. In this way, if a plurality of suspension fabrics are arranged, the effect of holding the shape of the main body (1) of air bag can be improved.

It may be applied that the suspension fabric (2) is of a cross-shape, each of the small sub-air chambers (4) is independently arranged and the through-pass holes (9) are provided at each of the suspension fabrics (2).

Figure 46:
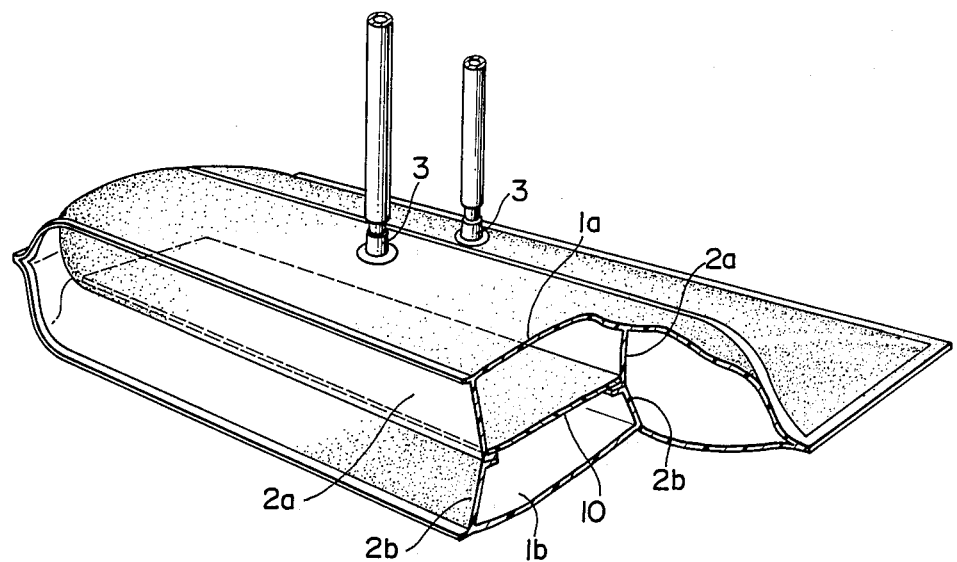
Figure 47:
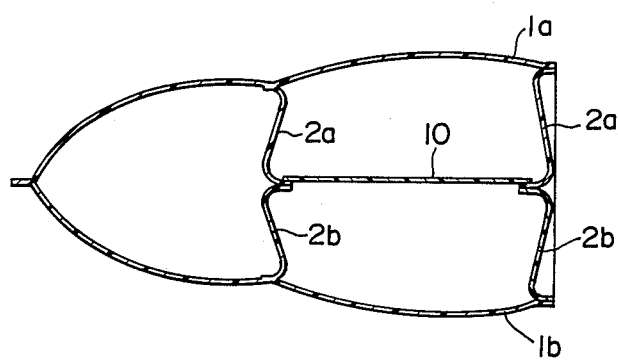
Figure 48:
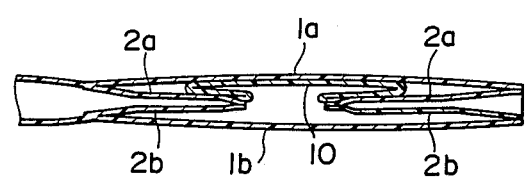
Figure 49:
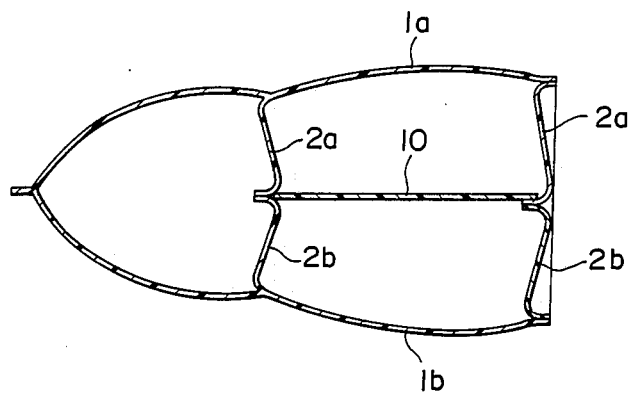
Figure 50:
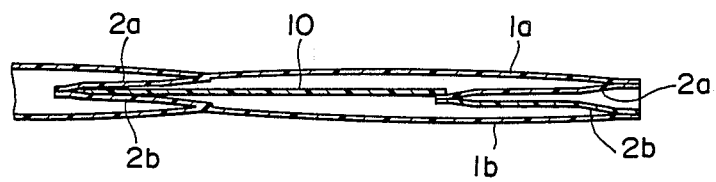
Figure 51:
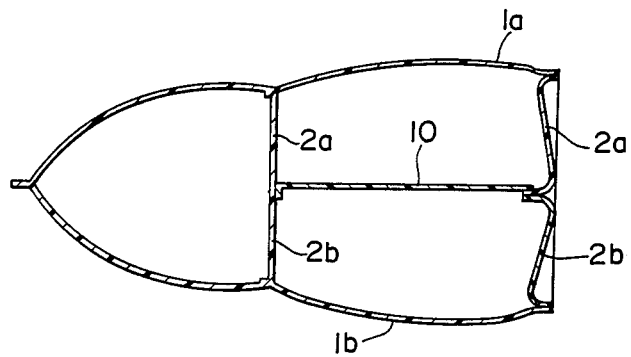
Figure 52:
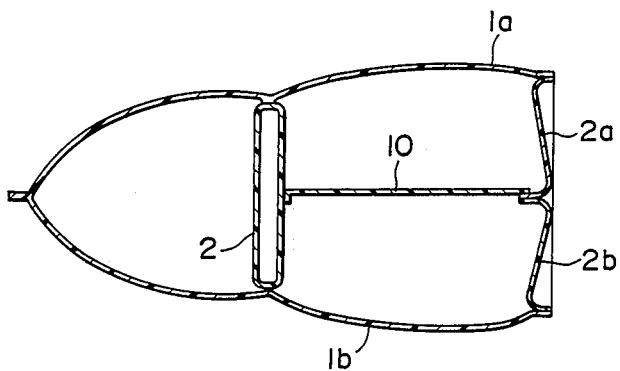
Figure 53:
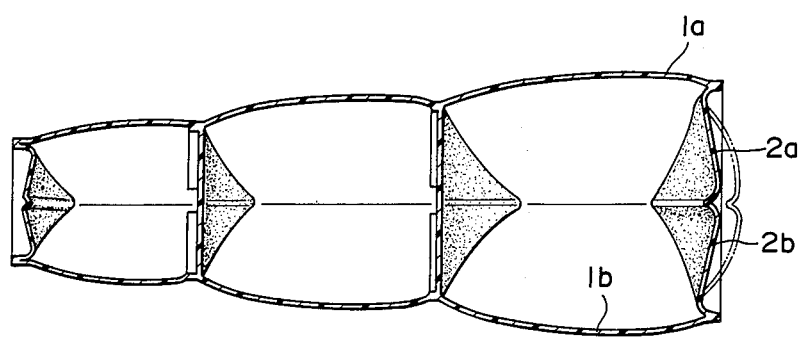
Figure 54:
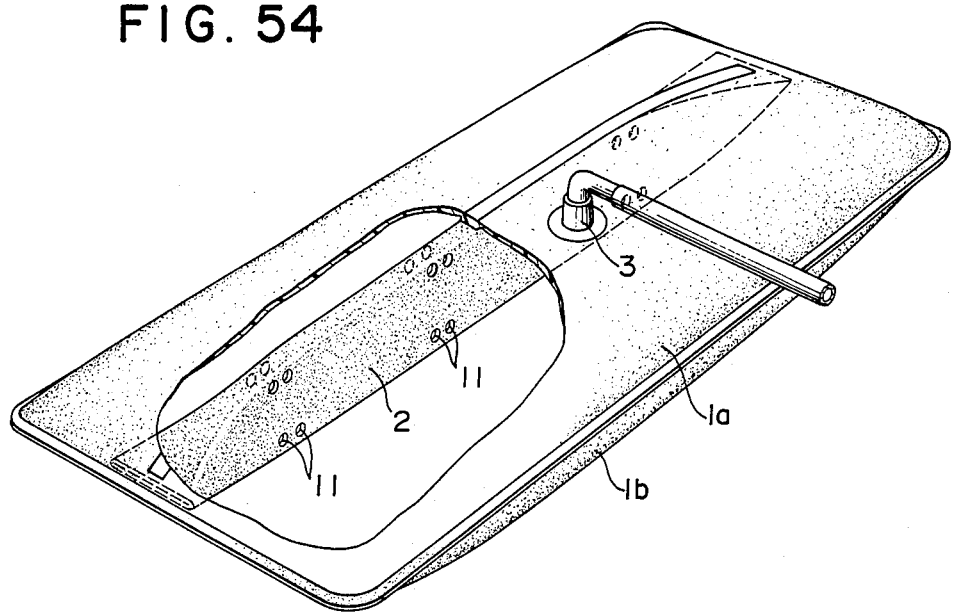
Figure 55:
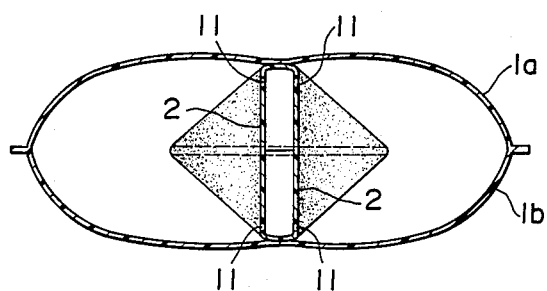
Figure 56:
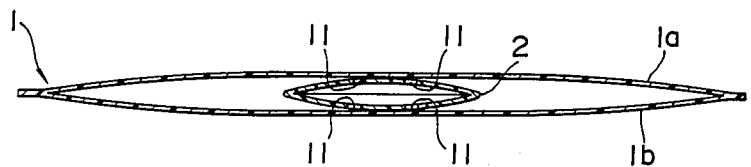
Figure 57:
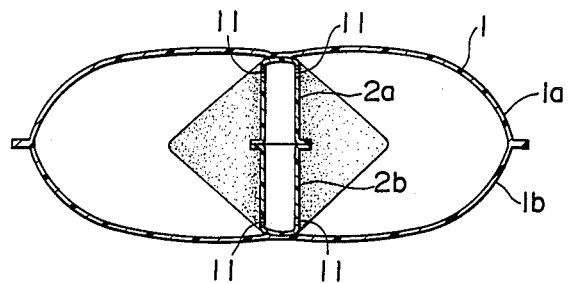
Figure 58:
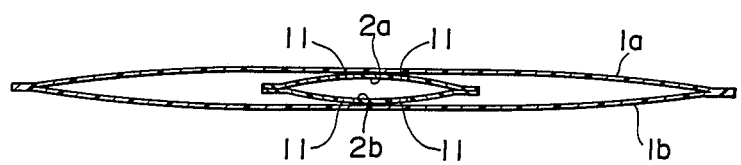
Figure 59:
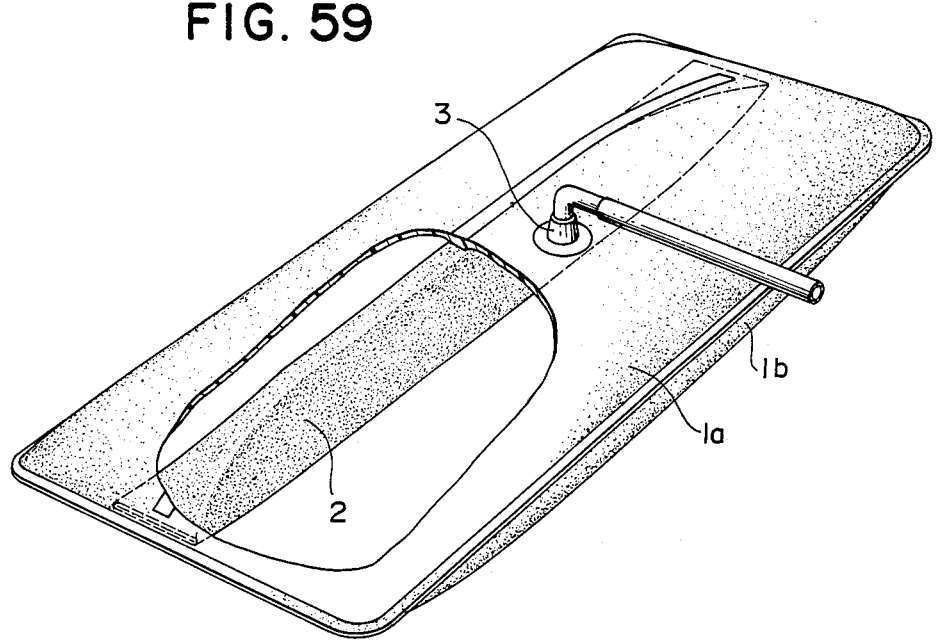

An improvement in the suspension fabric (2) will be described with reference to FIGS. 46 to 53, in which an inversion preventive fabric (10) is arranged between the suspension fabrics (2). FIGS. 46 to 48 show the state wherein the inversion preventive fabric (10) is joined at the side of the upper suspension fabric (2a). FIGS. 49 and 50 show the state wherein the one is held and joined between the upper suspension fabric (2a) and the lower suspension fabric (2b). FIG. 51 shows the state wherein one end of the inversion preventive fabric (10) is bended and fixed to the central portion of the suspension fabric (2). FIG. 52 shows the state wherein the suspension fabric (2) is in the form of a tube, and FIG. 53 shows the basic one of the present invention. FIGS. 54 to 58 illustrate the invention with a further improved tubular suspension fabric (2), and FIG. 59 shows the basic invention to supplement said illustration. The tubular suspension cloth (2) shown in FIG. 59 is operated such that when the main body (1) of the air bag is expanded, it is expanded with the front and rear surfaces curved outwardly and both front and rear surfaces in the circumferential surfaces of the main body (1) are rounded, and therefore, the tubular suspension fabric (2) is not evenly tensioned over the full length thereof to create shrinkages as shown in the circumferential surface of the suspension fabric (2). The shrunk portions of the suspension fabric (2) are inverted with variation of tension applied to the suspension fabric (2), thus posing a disadvantage in that there gives out a large hollow sound. However, such a hollow sound has been eliminated to produce by the provision of inversion preventive holes (11) as shown in FIGS. 54 to 58.

Figure 34:
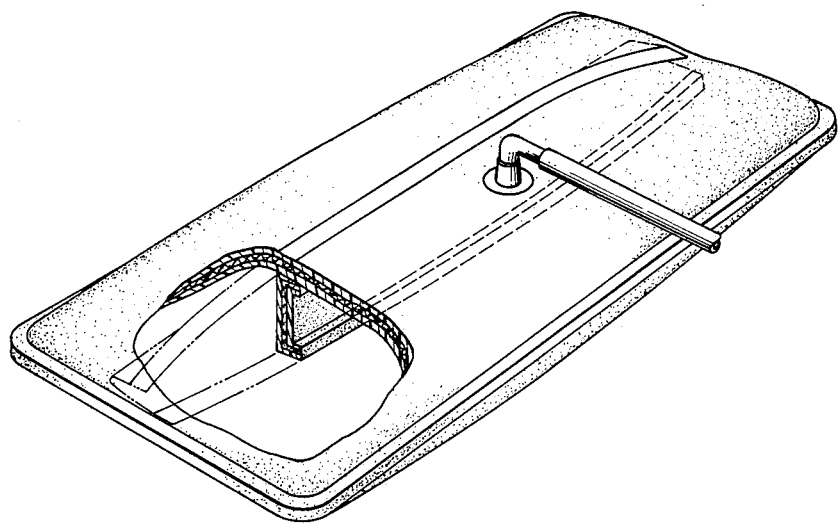
FIGS. 34 to 45 show embodiments of an air support according to the present invention which utilizes tarpaulin. More specifically.
Figure 35:
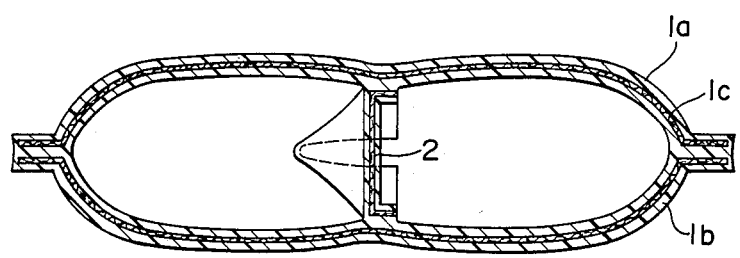
Figure 36:
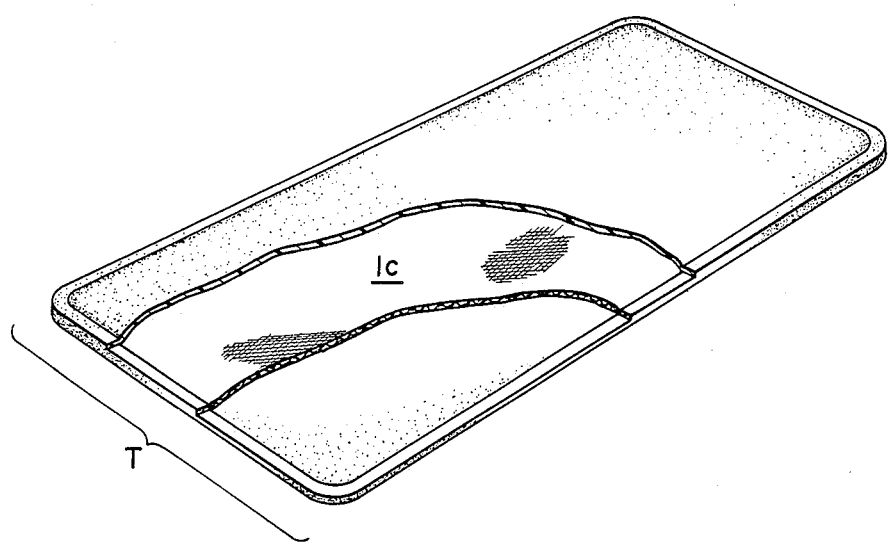

While sheets of thermoplastic soft urethane resin have been principally used as material used in the basic invention, it is noted that material used in the present invention is not limited thereto but tarpaulin as shown in the second invention may well be used to further increase the effect. The tarpaulin material will be described in detail. The main body (1) of the air bag shown in FIGS. 34 and 35 uses a tarpaulin material (T) consisting of three layers, namely, thermoplastic synthetic resin sheets provided on the front and rear surfaces and a fabric (1c) sandwiched between said sheets. This thermoplastic resin sheet comprises, for example, a thermoplastic soft urethane resin sheet, and the fabric (1c) comprises nylon or those having a high tension of polyesters.

Figure 37:
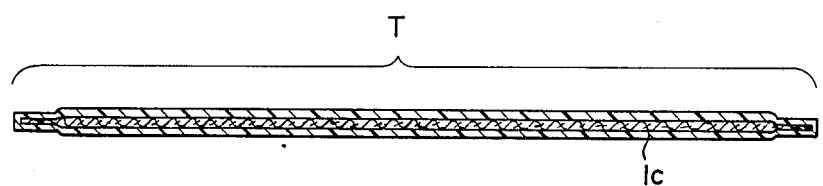

In forming the tarpaulin material (T) as shown in FIG. 37, urethane resin sheets are placed on both surfaces of the fabric (1c) with the latter sandwiched therebetween, and the circumferential edges of these three elements are melted and adhered together with a desired width to form a three-layer sheet-like construction.

In forming the main body (1) of the air bag, two tarpaulin sheets (T) are overlapped to each other, the suspension fabric (2) also comprising the tarpaulin material (T) is melted and adhered to the overlapped surface, and thereafter the circumferential edges are again thermally melted and adhered together.

While the aforementioned main body (1) of the air bag has been formed by the tarpaulin material (T) whose peripheries are thermally melted and adhered, it is noted that the main body (1) of the air bag may be formed by overlapping two fabrics (1c) and four urethane resin sheets in the desired order, and thermally melting and adhering the circumferential edges at a time.

Figure 38:
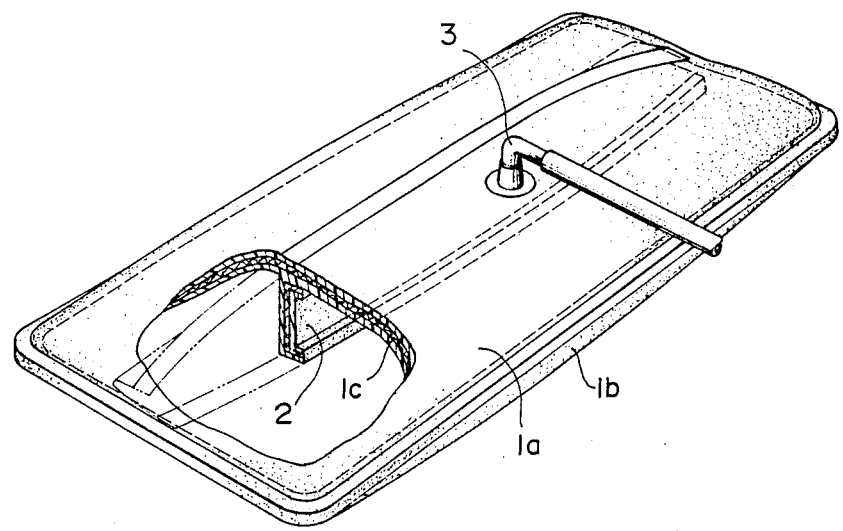
Figure 39:
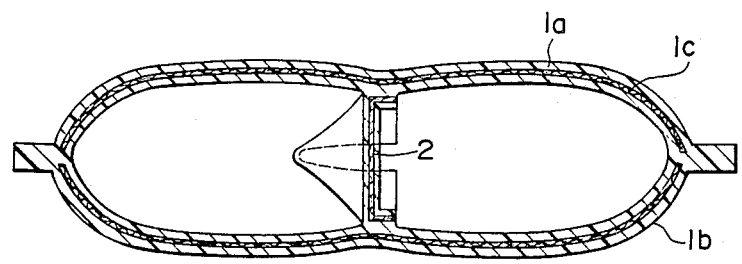
Figure 40:
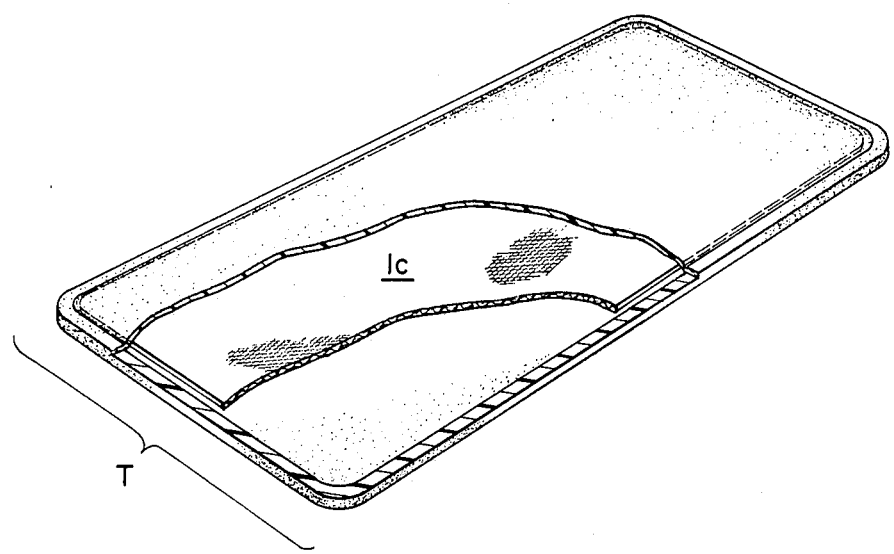
Figure 41:
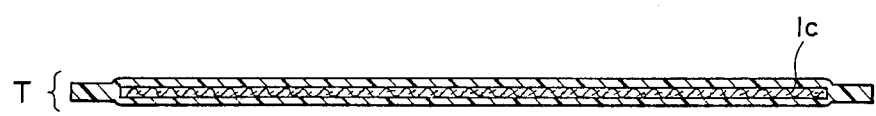

The main body (1) of the air bag shown in FIG. 38 is formed of the tarpaulin material (T) as shown in FIGS. 40 and 41 in the manner similar to that of the main body (1) of the air bag.

Figure 42:
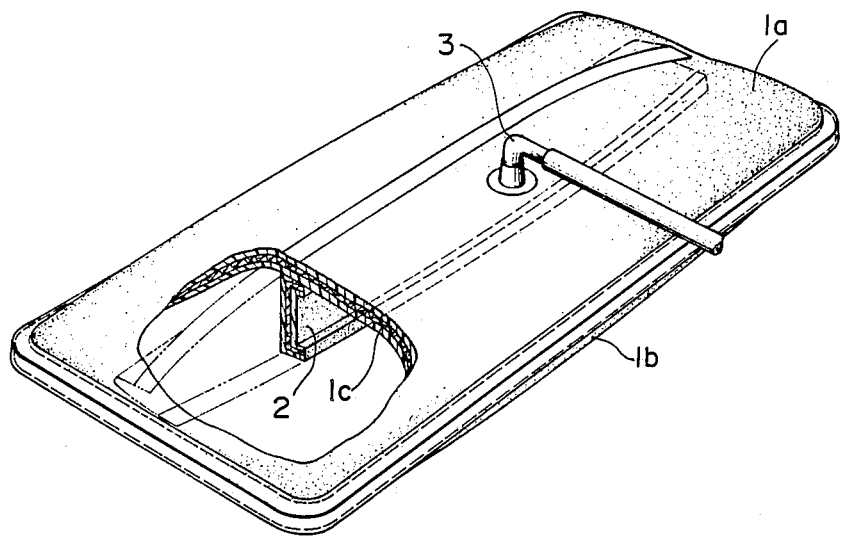
Figure 43:
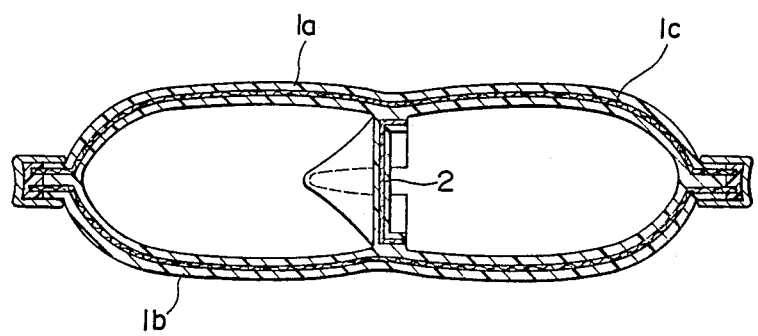
Figure 44:
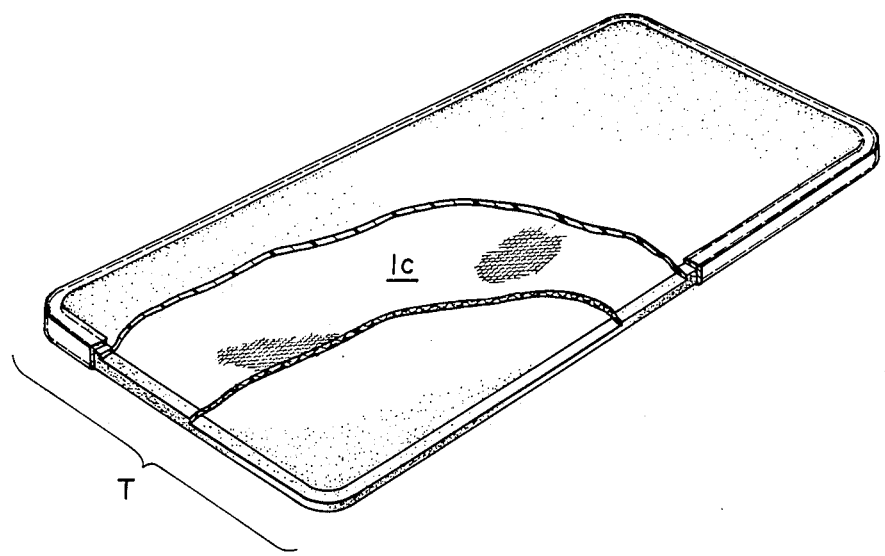
Figure 45:
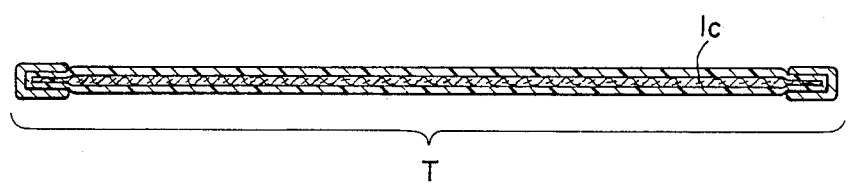

The main body (1) of the air bag shown in FIGS. 42 and 43 is formed of the tarpaulin material (T) as shown in FIGS. 44 and 45 in the manner similar to that of the main body (1) of the air bag as described above.

The aforesaid tarpaulin material (T) is formed by overlapping the fabric (1c) cut into a planar rectangular shape and both front and rear urethane resin sheets, sewing the circumferential edges of these three elements together as shown in FIG. 44, thereafter coating the surfaces of the seam allowance with coating sheets comprising thermoplastic synthetic resin such as thermoplastic soft urethane resin, and thermally melting and adhering the coating sheets and the seam allowance of the both front and rear sheets to keep air-tightness thereof.

Figure 68:
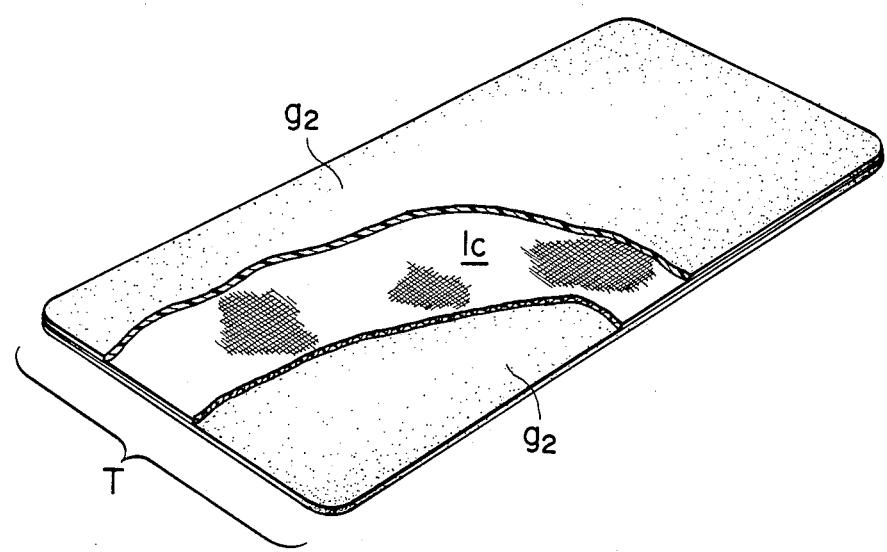
Figure 69:
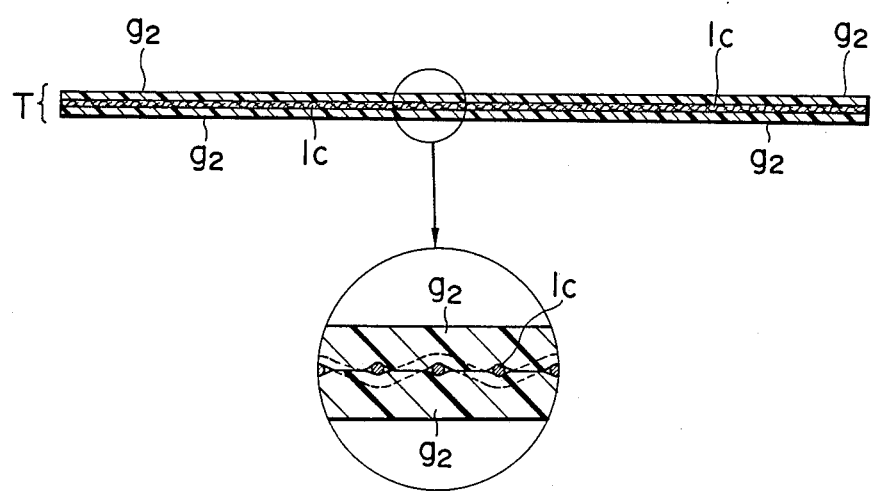

The tarpaulin material (T) taken in the best form has the sectional construction as shown in FIGS. 68 and 69. More accurately, the fabric formed from yarns having coarseness of 50 to 100 microns provided with a non-expanding and high tensile properties and having the number of meshes of 70 to 200 is sandwiched between two thermoplastic synthetic resin sheets, and both the sheets are wholly thermally melted and adhered.

Figure 75:
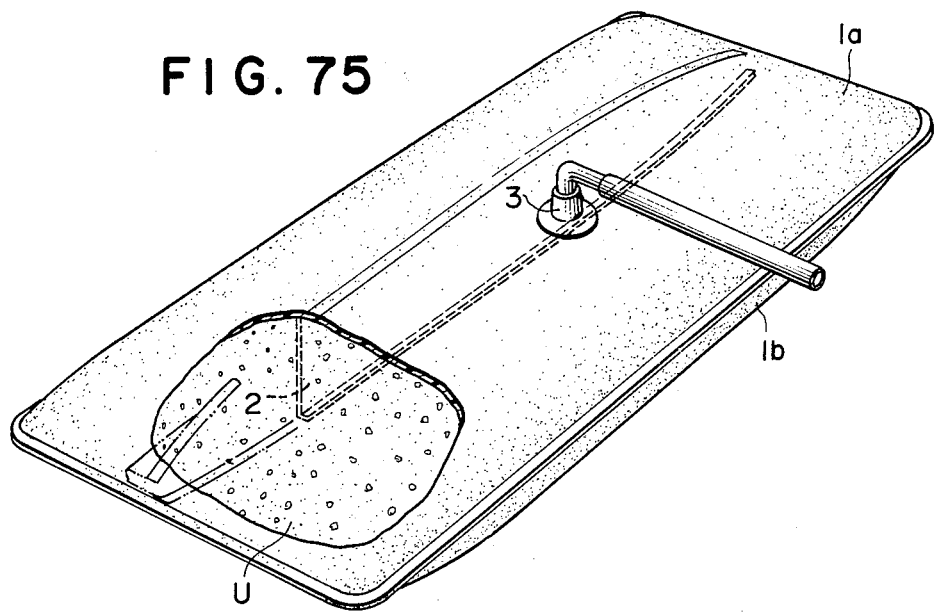
FIGS. 75 to 77 illustrate the third invention.
Figure 76:
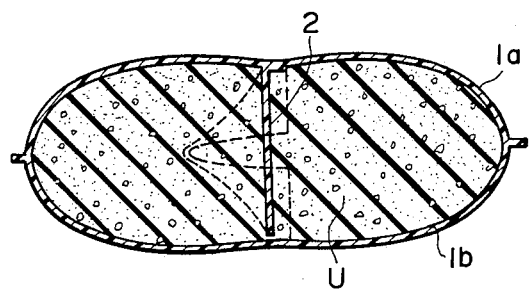
Figure 77:
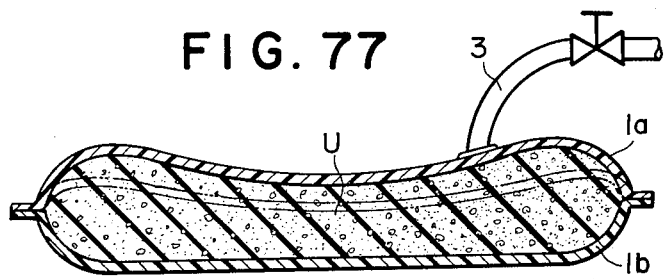

The embodiment of the third invention will be described with reference to FIGS. 75 to 77, in which an urethane foam (U) is inserted into the main body (1) of the air bag having the suspension fabric (2) to constitute an air support for chair. If the urethane foam (U) has the same effect as that of the suspension fabric (2), the suspension fabric is not always required. The first example of mixture of the urethane foam (U) is as follows.

The reaction temperature of the urethane foam is approximately 60° C. to 70° C., and the density thereof is 50 kg/m$^3$ and hardness is 20 kg.

Figure 23:
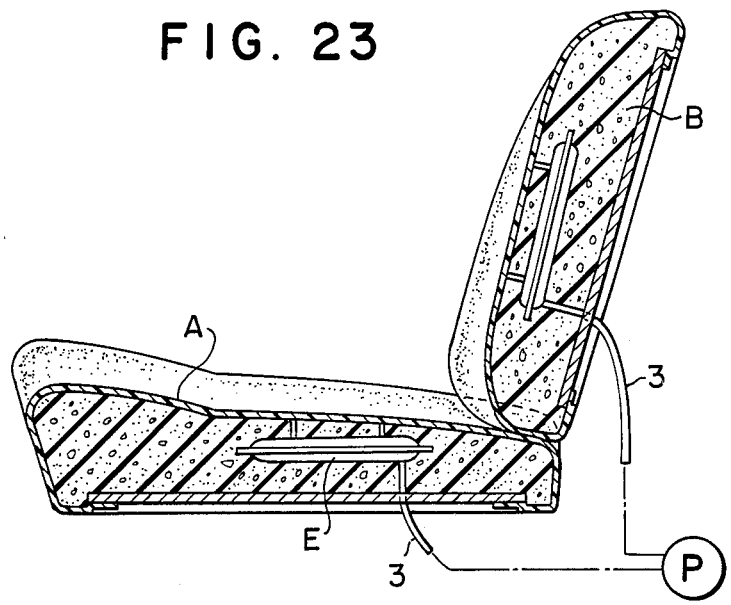
FIGS. 23 to 29 show a method for manufacture in the case of utilizing an air support for chair according to the present invention in a chair etc.
Figure 24:
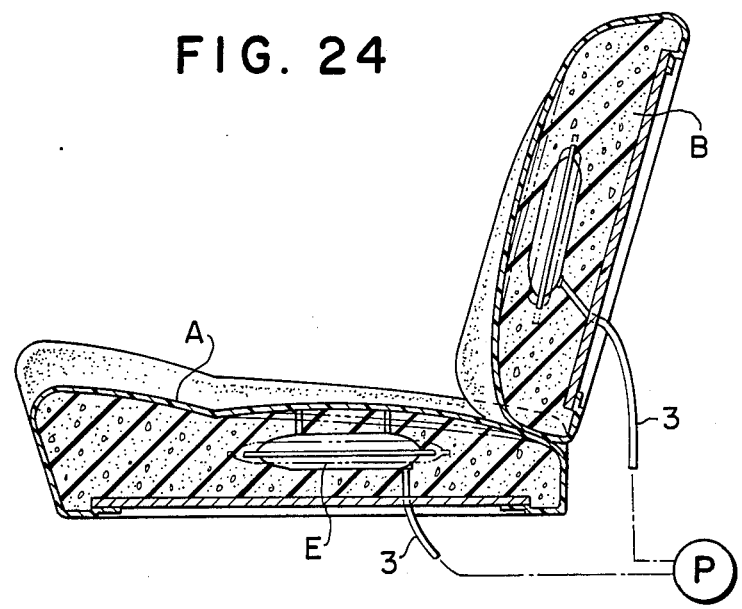

Then, the invention for utilizing an air support for chair relating to the present invention shall be explained. One or suitable number of the air support for chair provided with an air feed and discharge port (3) connected to a pump not shown in Figures is or are enclosed airtightly in a seat cushion (A) or seat bag (B), as shown in FIG. 23 and FIG. 24. Air is supplied from the pump through the air feed and discharge port (3) to the seat cushion (A) or seat bag (B) under such airtightly enclosed state until desired cushion feeling is obtained and the air is discharged when this air support is not in use.

Figure 25:
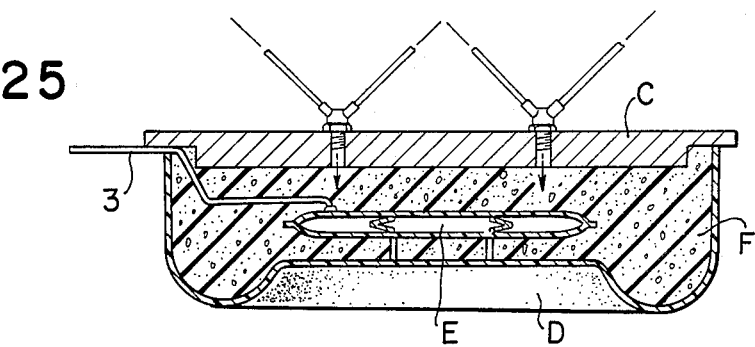
Figure 26:
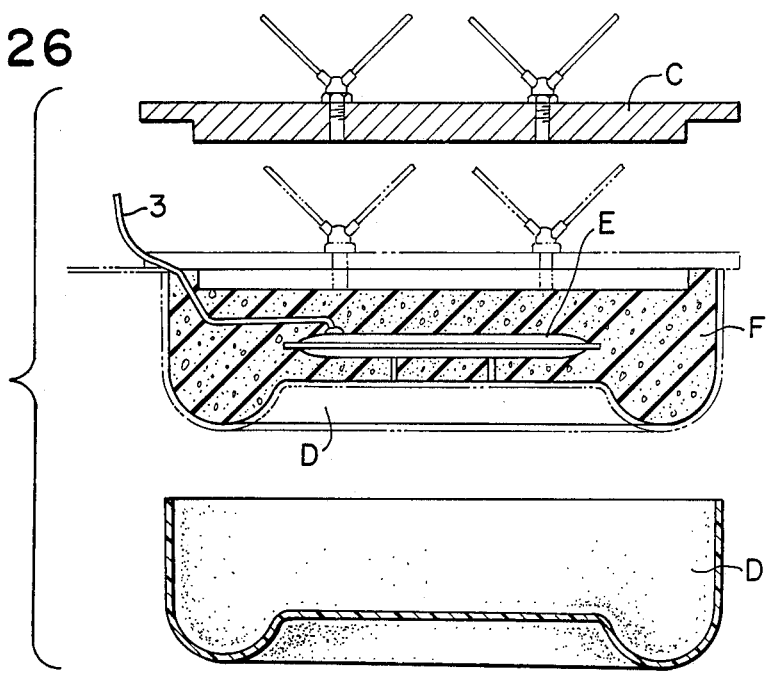
Figure 27:
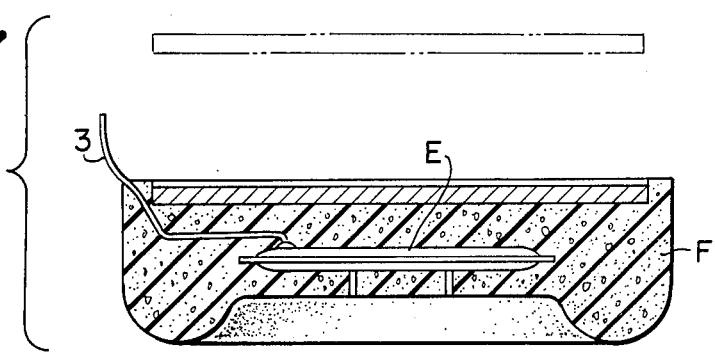

The method for manufacturing a chair utilizing this air support is such that a forming mold is composed of the upper mold (C) and the lower mold (D) as shown in FIG. 25, FIG. 26 and FIG. 27, and the air feed and discharge port (3) of the air support for chair is set outside the mold as well as air support (E) for chair is enclosed in the central area between the upper mold and the lower mold in floating state.

The expandable and retractable foam material (F), for example, urethane under this condition will be described.

| 1. Compound of urethane | |
|---|---|
| Polyol | 100 |
| Isocyanate | 40 to 50 |
| Zinc oxide: | heat-resistant stabilizer for polyvinyl chloride, foaming assistant |
| Water + tertiary amine 3 to 4: | foaming agent |
| Foaming regulating agent of silicon | 1 to 2 |
| Catalyst of tin | 0.2 to 0.4 |

The above-mentioned expandable and retractable foaming material is poured into the mold, an entire circumference of the air support (E) for chair is covered with the prior expandable and retractable foaming material, thereafter foamed and cured to form the air support. Physical quality of the exapandable and retractable foaming material is as follows.

| | Note | |
|---|---|---|
| 1. | Apparent density (ASTM) | 52.3 kg/m$^3$ |
| 2. | Hardness (JIS 50 m/mt) | Product 69 m/mt |
| | Load at a flexing of 25% | 16.8 kg/314 cm$^2$ |
| | Load at a flexing of 65% | 65 kg/314 cm$^2$ |
| 3. | Tensile strength (JIS) | 1.23 kg/cm$^2$ |
| 4. | Rate of elongation (JIS) | 145% |
| 5. | Tensile strength (ASTM) | 0.97 kg/cm$^2$ |
| 6. | Repletion resiliency (JIS) | 32.1% |
| 7. | Compression residual degree (JIS) | 3.9% |
| 8. | Repetitive compression residual degree | 3.4% |

Figure 28:
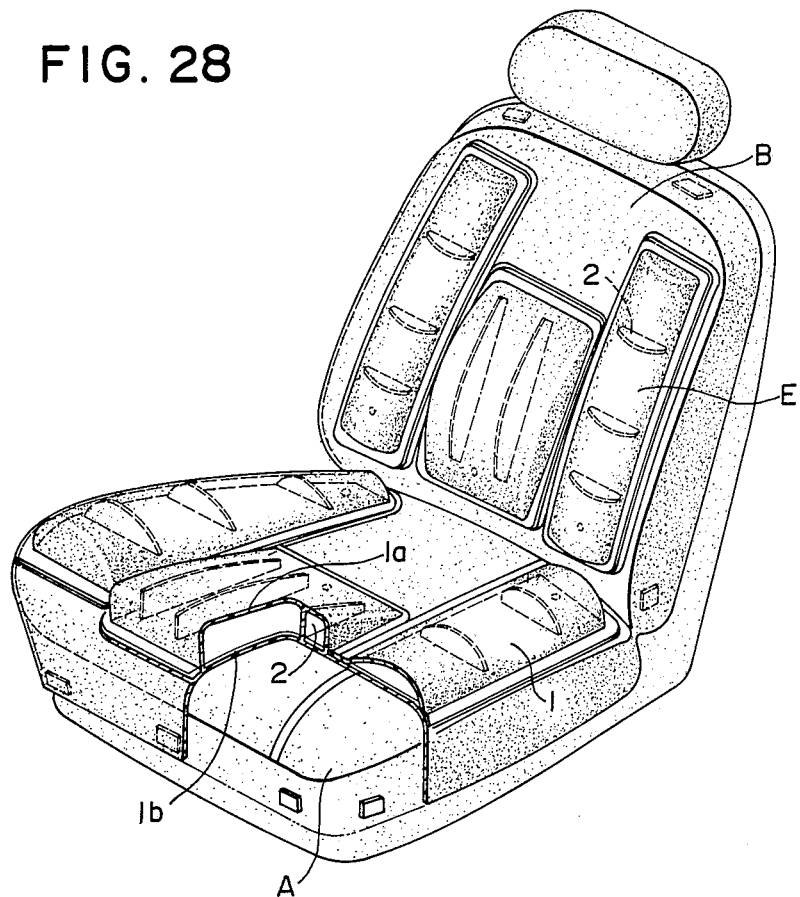
Figure 29:
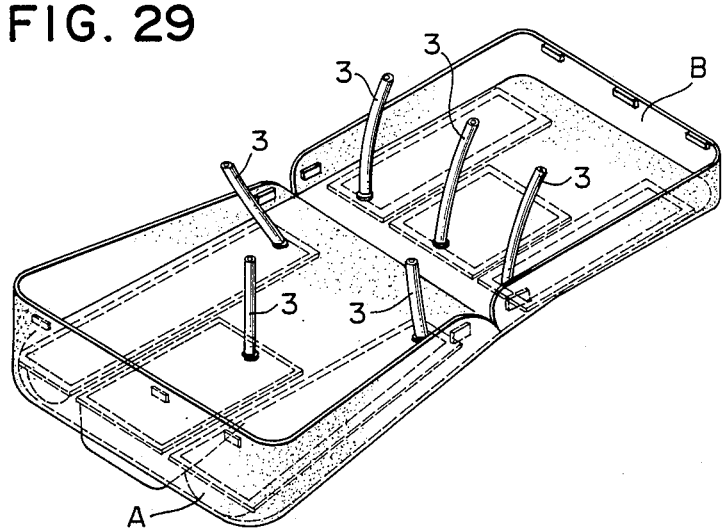
Figure 30:
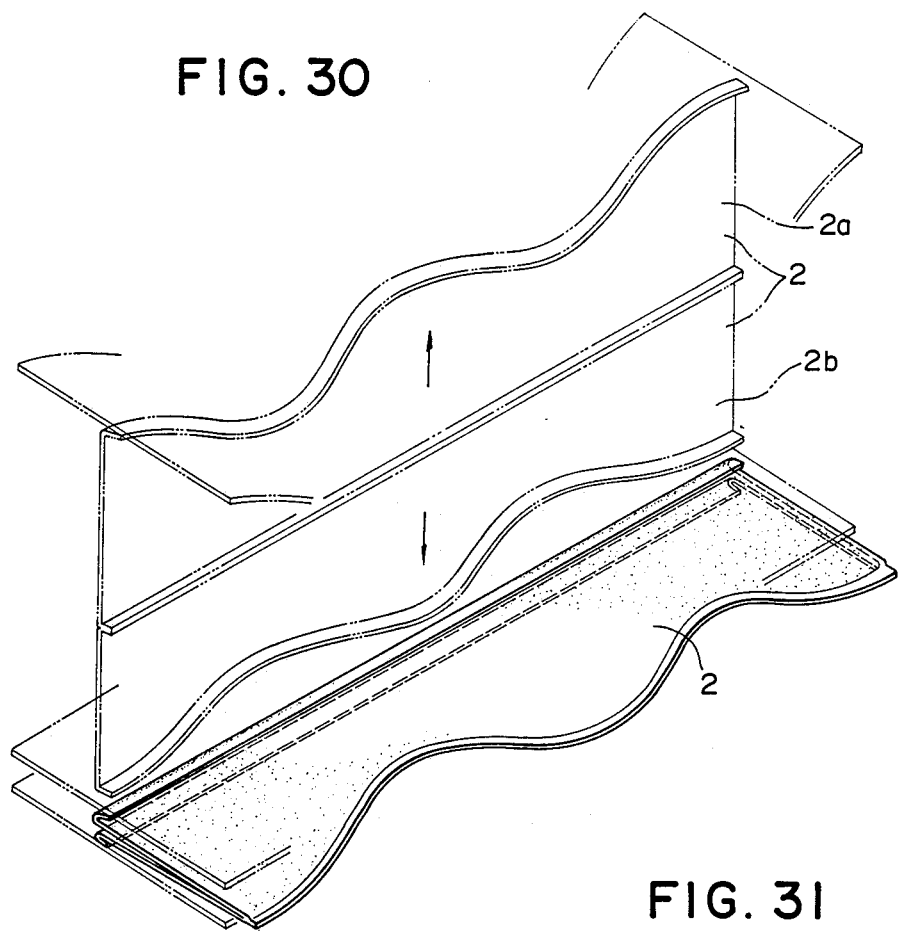
FIGS. 30 to 33 and FIGS. 46 to 59 show particular suspension fabric.
Figure 31:
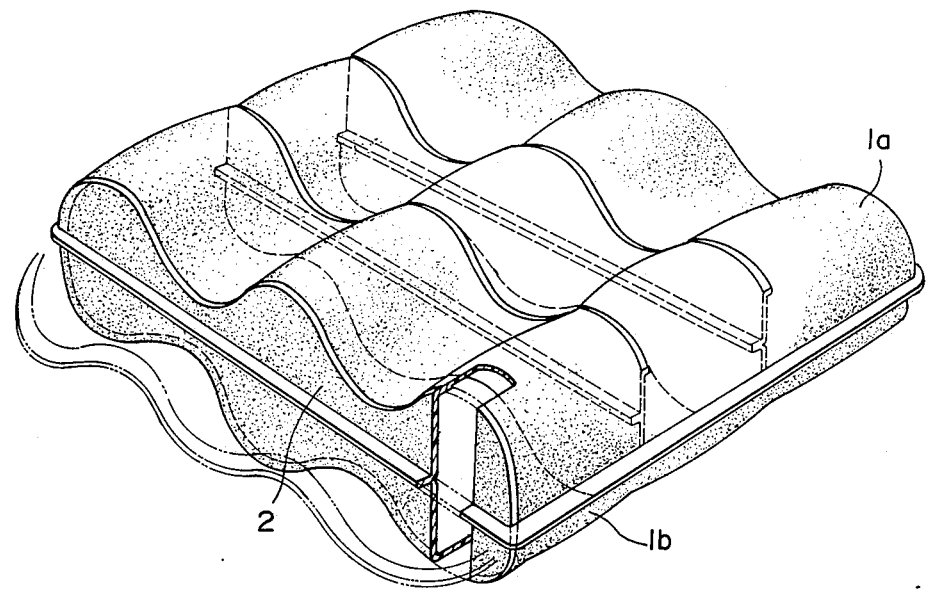

In case that the air support (E) for the chair is independently applied in the seat cushion (A) or seat back (B) of the seat, as shown in FIGS. 28 and 29, the air support (E) for the chair is placed at a proper location of the seat cushion (A) or the seat back (B), the pipe part of the air feeding and discharging port (3) is passed through the seat cushion (A) or the seat back (B) and connected to a pump (not shown) to perform the feeding and discharging of air.

Figure 71:
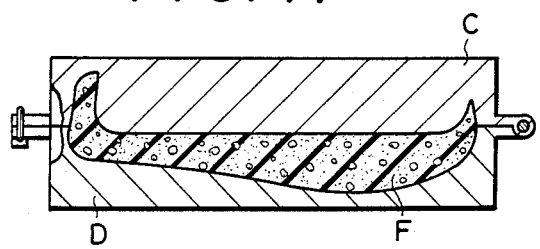
FIGS. 70 to 74 show an improved method for manufacture. In addition.
Figure 70:
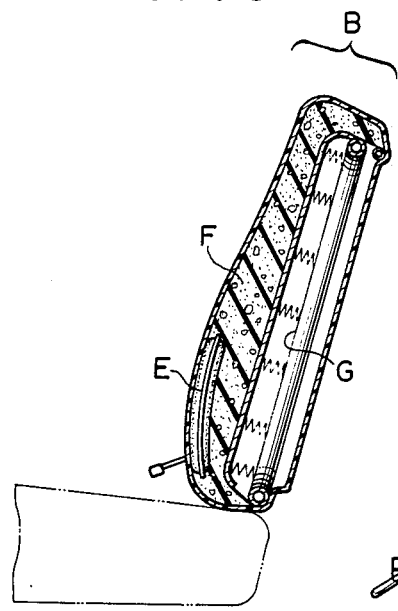
Figure 72:
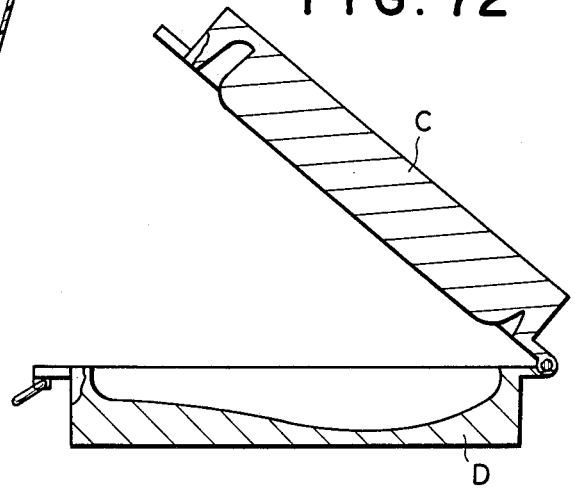
Figure 73:
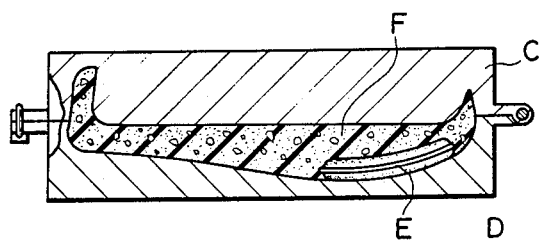
Figure 74:
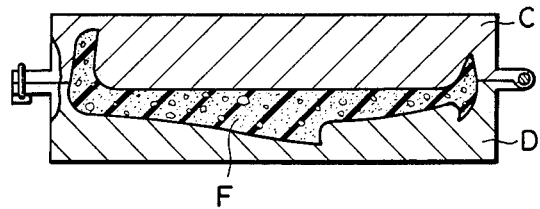

The invention of another method for manufacturing a chair using an air support will be described. FIG. 71 shows a conventional mold for a chair, FIG. 72 shows a mold with a cover opened, and FIGS. 73 and 74 are respectively sectional views of a mold used in the method according to the present invention. FIG. 70 shows a seat bag for a chair finished by said method, which method can be used to manufacture a seat cushion. The characterizing portions will be described in the following. An air support (E) is incorporated in advance into a lower mold (D) as shown in FIG. 73 for molding. In this case, a portion where the air support (E) for chair is set in the lower mold (D) is raised as shown in FIG. 74 to form a seat back (B). This idea is applied to mold the seat cushion (A). A supporting frame (G) is set within the mold, after which the expandable and retractable foaming material (F) may be poured therein. One example of the expandable and retractable foaming material (F) is shown in the following.

The reaction temperature is approximately 180° C., the density is 35 kg/m$^3$ and the hardness is 15 kg.

The seventh invention will now be described with reference to FIGS. 60 to 69.

Figure 60:
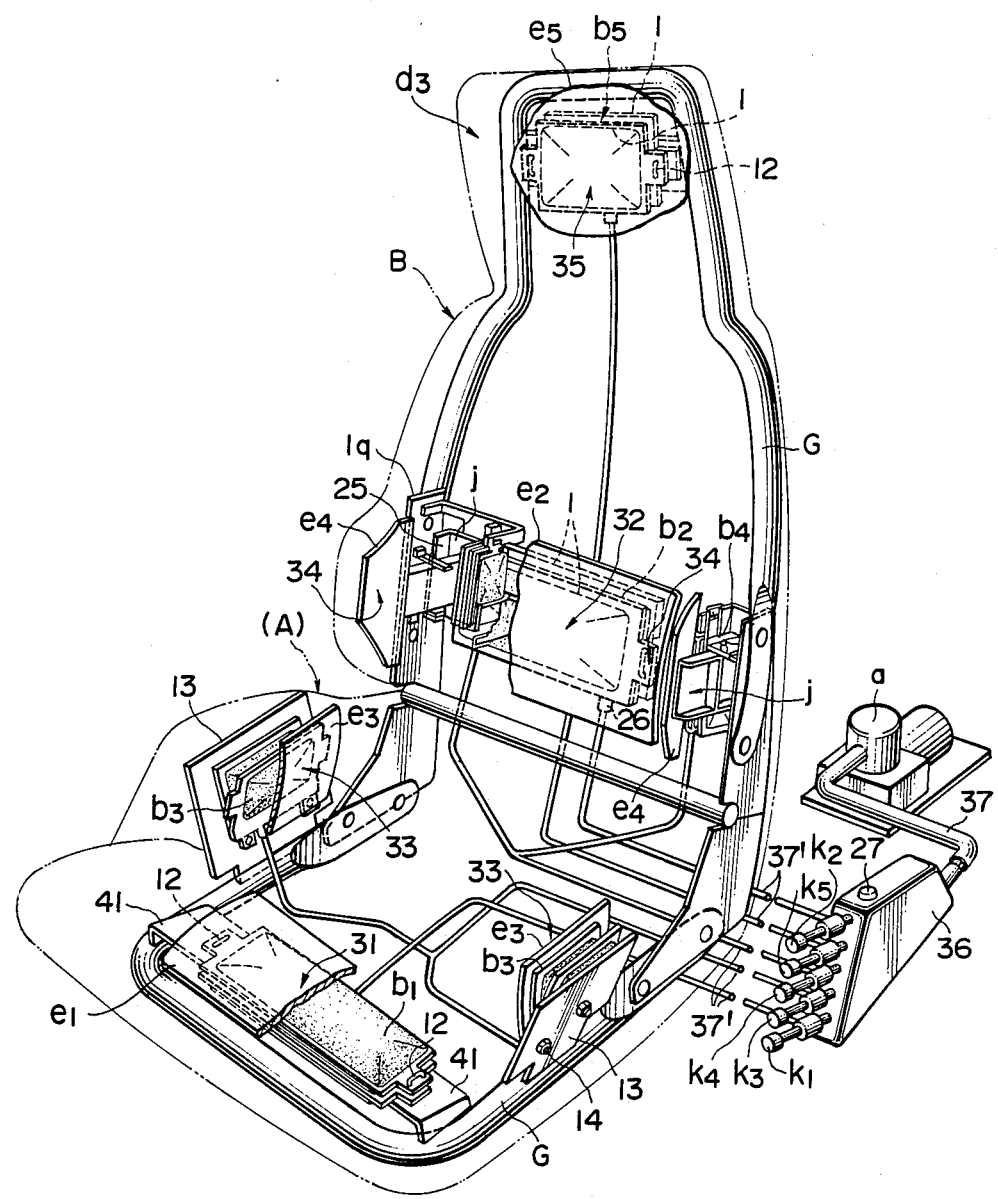
Figure 61:
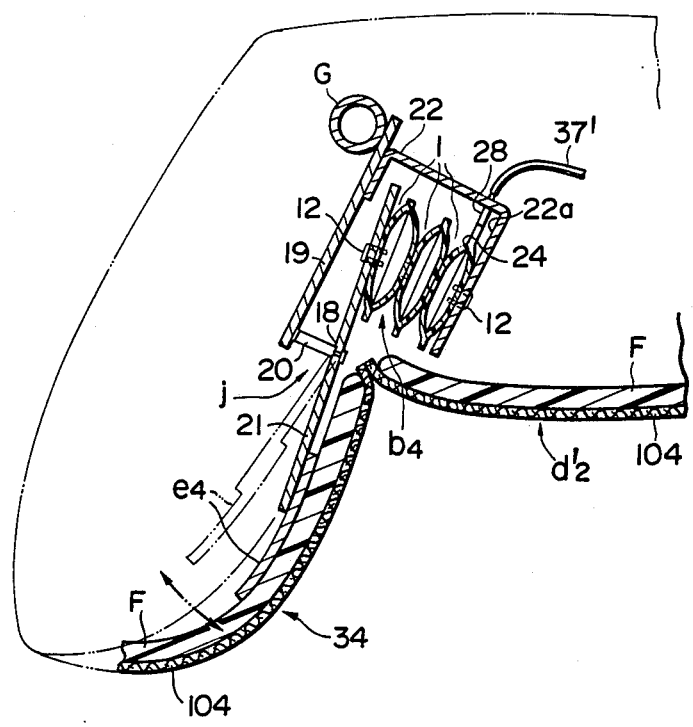
Figure 62:
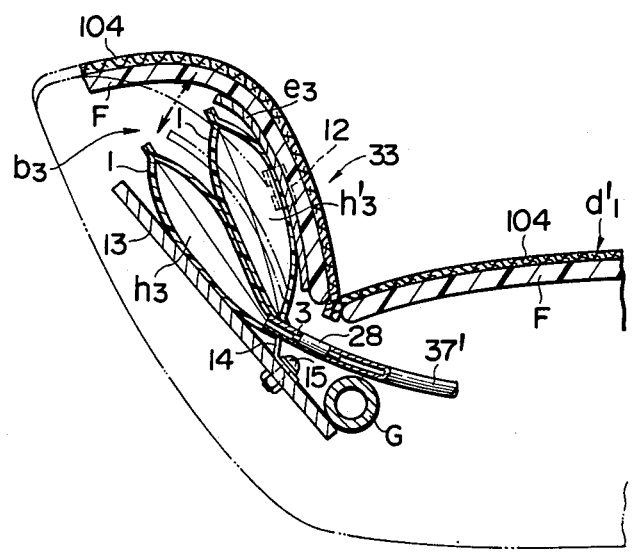
Figure 63:
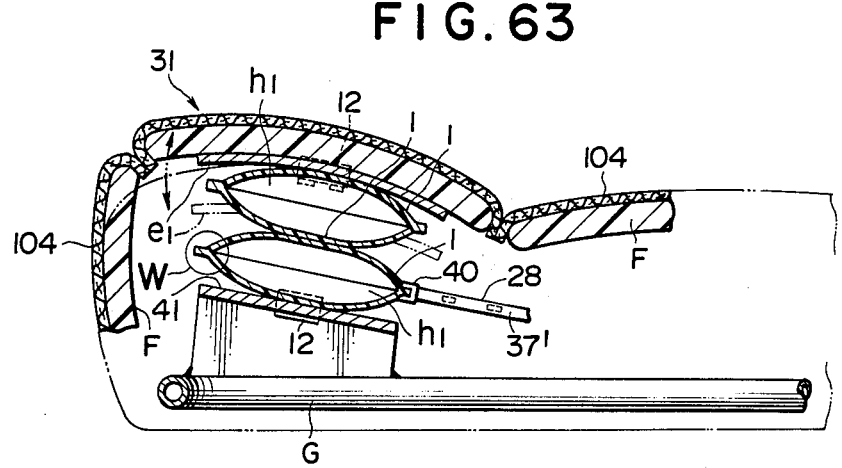

FIG. 60 shows a vehicle seat provided with a support device, in which a seat cushion (A), a seat back (B) and a head rest (d$_3$) are integrally provided, and said seat back (B) may be swung forwardly and backwardly from the connection with the seat cushion (A). A supporting frame (G) which forms a skelton of the seat cushion (A) and the seat back (B) is formed from a pipe and a steel plate and is covered with the expandable and retractable foaming material (F) of the desired wall-thickness and a trim cover (104) as shown in FIGS. 61 to 63.

The support device comprises expandable and retractable members ($b_1$), ($b_2$), ($b_3$), ($b_4$) and ($b_5$) which are mounted on and secured to the desired locations in the seat supporting frame (G) and are expanded and retracted by supplying and discharging air fed from an air pump (a) which will be described later, support plates ($e_1$), ($e_2$), ($e_3$), ($e_4$) and ($e_5$) which are connected to the expandable and retractable members ($b_1$) to ($b_5$), respectively, directly or through the operating mechanism and provided along the desired parts of the rear surface of the expandable and retractable foaming material (F), and an air pump (a) for supplying air to the expandable and retractable members ($b_1$) to ($b_5$).

The expandable and retractable members ($b_1$) to ($b_5$) are mounted on and secured to the desired locations of the seat supporting frame (G). An air pipe (37) from the air pump (a) is branched into several pipes through a branch valve (36), and these branched pipes (37') are connected to the expandable and retractable members ($b_1$) to ($b_5$), respectively, whereby air from the air pump (a) is branched by the branch valve (36) to feed air to the suitable expandable and retractable members ($b_1$) to ($b_5$).

The support plates ($e_1$) to ($e_5$) are provided to support the desired parts of the human body as mentioned above, the support plate ($e_1$) being disposed on a portion corresponding to a femoral portion in the seat surface of the seat cushion (A), the support plate ($e_2$) disposed on a portion corresponding to the back of the back rest surface of the seat back (B), the support plates ($e_3$) and ($e_4$) disposed on both sides of thighs of the seat surface and both sides of the waist of the back rest surface, and the support plate ($e_5$) disposed on the surface of the head rest portion ($d_3$). Portions where the support plates ($e_1$) to ($e_5$) in the seat surface are disposed are called the thigh support (31), the lumbar support (32), the side supports (33) (34') and the head support (35), respectively.

The expandable and retractable members ($b_1$) to ($b_5$) and the support plates ($e_1$) to ($e_5$) are selected in their construction, surface shape and operation according to the regions of the human body which are to be supported. However, a plurality of the main bodies (1) of the air bag are placed one above another to constitute the expandable and retractable members ($b_1$) to ($b_5$), the support plates ($e_1$) to ($e_5$) are connected to the expandable and retractable members ($b_1$) to ($b_5$), and air fed from the air pump (a) are supplied to and discharged from the expandable and retractable members ($b_1$) to ($b_5$) to move the support plates ($e_1$) to ($e_5$) connected to the expandable and retractable members ($b_1$) to ($b_5$) to and from the seat surface.

The expandable and retractable members ($b_1$) to ($b_5$) are formed of the three-layer tarpaulin material (T) as shown in FIG. 69. This tarpaulin material (T) is formed by sandwiching the fabric ($1c$), which is woven with yarns having a coarseness of 50 to 100 microns provided with the non-expandable and retractable properties and high tensile strength and the number of meshes of 70 to 200 between two thermoplastic synthetic resin sheets ($g_2$) and ($g_2$), and wholly thermally melting and adhering both the thermoplastic synthetic resin sheets ($g_2$) ($g_2$) together to provide an integral structure of three elements ($1c$), ($g_2$) and ($g_2$). Yarns for constituting the fabric ($1c$) comprise, for example, such as polyester or polyamide, and the thermoplastic synthetic resin sheets ($g_2$) ($g_2$) comprise thermoplastic soft urethane resin which is somewhat harder than normal resin.

The tarpaulin material (T) thus constructed is possible to prevent elongation by the fabric ($1c$) and restrain the wall-thickness of the material (T) itself to a degree that the flexibility of the material (T) is not impaired.

However, the main body (1) of the air bag formed by use of the tarpaulin material (T) is less deformed when the high pressure is applied into the air chamber (h) and free from shrinkages resulting from the short in flexibility when expanded.

The expandable and retractable member ($b_1$) of the thigh support (31) and the support plate ($e_1$) are internally provided at the foremost portion of the seat surface.

Figure 64:
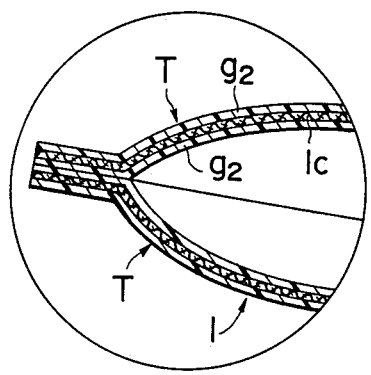
Figure 65:
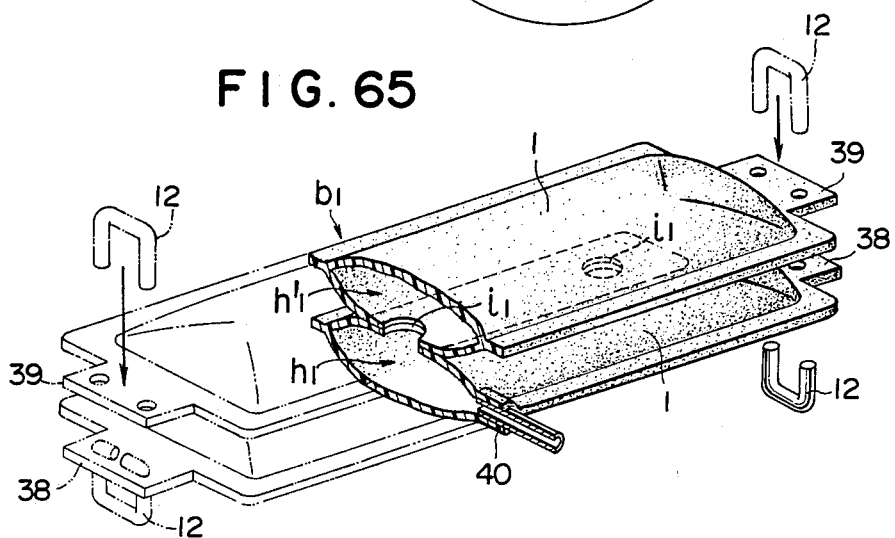
Figure 66:
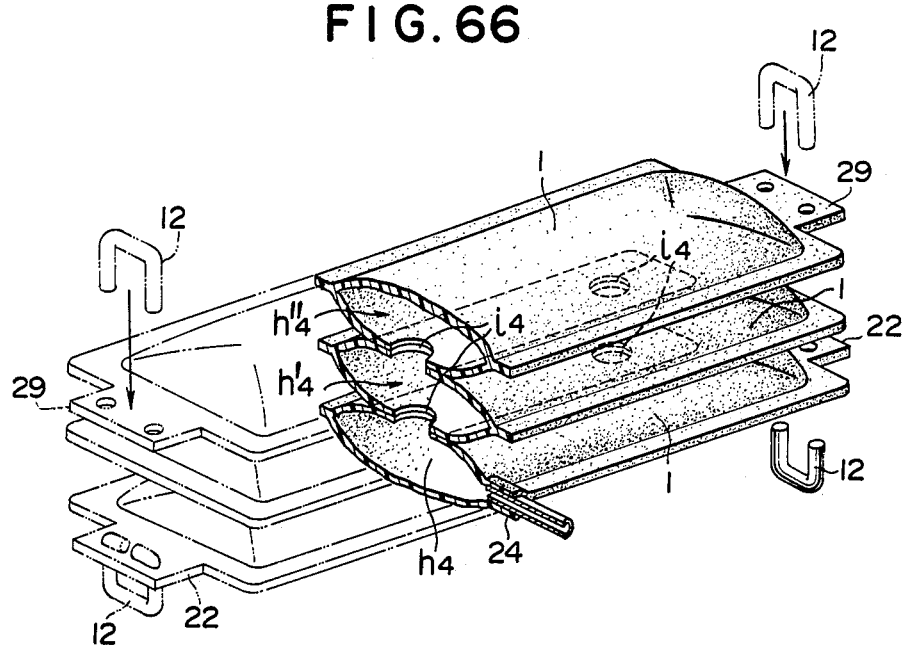

The expandable and retractable member ($b_1$) of the thigh support (31) is used so that the tarpaulin material (T) is cut into a generally rectangular shape as shown in FIG. 68, two sheets of such material (T) are placed one above the other, and the circumferential edges thereof are thermally melted and adhered together as shown in FIGS. 64 and 65 to form the main body (1) of the air bag. These main bodies (1) of the air bags are placed one above the other, and the central portion of the contact surface therebetween is thermally melted to join both the main bodies (1) of the air bags together, and air through-pass holes ($i_1$) ($i_1$) to communicate the air chambers ($h_1$) ($h_1'$) of both the main bodies (1) of the air bags are bored in the region of the joined location.

Mounting lugs (38) (38) are projected from both end edges of the main body (1) of the air bag underside of the expandable and retractable member ($b_1$), supporting lugs (39) (39) similar to the mounting lugs (38) (38) are projected from both end edges of the main body (1) of the air bag on the upper side, an air port (40) for moving air in and out of the air chamber ($h_1$) of the main body (1) of the air bag is provided in the circumferential edge of the main body (1) of the air bag, and an air pipe (37') branched from the branch pipe (30) is connected to the air port (40) through a connecting pipe (28).

The mounting lugs (38) (38) serve to fixedly mount the expandable and retractable member ($b_1$) on the supporting frame (G) in a manner such that the lugs (38) (38) are secured by means of fixing fittings (12) or screws to a base plate (41) mounted in the neighbourhood of the front end in the desired location of the supporting frame (G).

The supporting lugs (39) (39) of the main body (1) of the air bag serve to connect the support plate ($e_1$) to the surface of the main body (1) of the air bag and support the same and is fixed to the neighbourhood of the both ends of the rear face of the support plate ($e_1$) by fixing fittings (12) or by adhesion.

The support plate ($e_1$) is formed of synthetic resin or steel plate, and the surface thereof is adjusted to the surface of the femoral portion in the seat surface to form a natural curve. In the normal condition, the surface of the support plate ($e_1$) is applied to the rear surface of the expandable and retractable foaming material (F) of the thigh support (31) portion.

When the air is supplied from the air port (40) of the main body (1) of the air bag, the air passes through the air through-pass holes ($i_1$) ($i_1$) from the air chamber ($h_1$) and flows into the air chamber ($h_1'$) of the main body (1) of the air bag to expand the main body (1) of the air bag to expand the expandable and retractable member ($b_1$) itself. Thereby, the support plate ($e_1$) connected to the surface of the expandable and retractable member ($b_1$) extends toward the seat surface and the thigh support (31) portion of said seat surface inflates according to the expansion of the expandable and retractable member ($b_1$).

Figure 67:
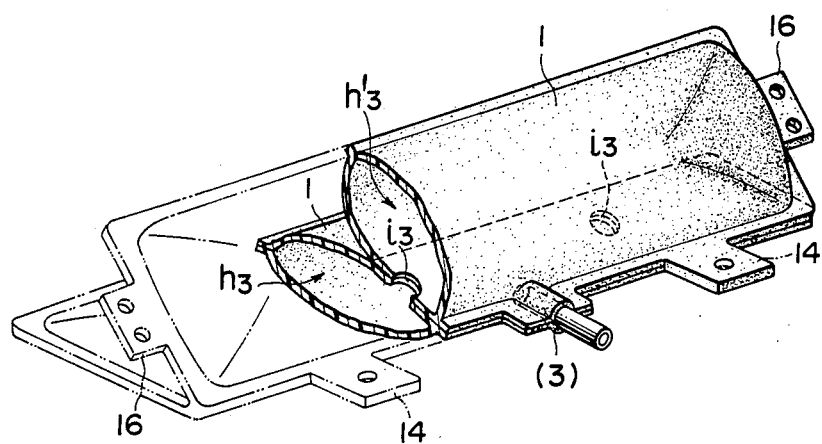

The expandable and retractable members ($b_3$) ($b_3$) of the side support (33) on both sides of the femoral portion have the construction as shown in FIGS. 62 and 67.

The expandable and retractable member ($b_3$) is constructed such that the tarpaulin materials (T) cut into a rectangular shape are placed one above the other, the main body (1) of the air bag whose circumferential edges are thermally melted and adhered is superimposed, the portion along one side edge on the longer side in the contacted surface therebetween is thermally melted and adhered to join both the main bodies (1) of the air bags together, and air through-pass holes ($i_3$) ($i_3$) to provide communication between the air chambers ($h_3$) ($h_3'$) of the main body (1) of the air bag are bored in the area of said joined portion.

The expandable and retractable members ($b_3$) ($b_3$) are mounted on the surface of base plates (13) (13), respectively, stood upright while being somewhat inclined from both sides of the supporting frame (G) toward the upper portion with the joined side directed downwardly. The mounting lug (14) (14) projected on one side edge of the main body (1) of the air bag of the expandable and retractable members ($b_3$) ($b_3$) are secured to the surfaces of the base plates (13) (13) by means of screws (15) and fixedly mounted on the surfaces of the base plates (13) (13).

The support plate ($e_3$) adjusted to the surface of the side support (33) of the seat surface is applied to the surface of the expandable and retractable members ($b_3$) ($b_3$), and the supporting lugs (16) (16) projected on both end edges of the main body (1) of the air bag are secured to the rear surface of the support plate ($e_3$) by means of fixing fittings (12) to thereby connect the support plate ($e_3$) to the surfaces of the expandable and retractable members ($b_3$) ($b_3$). The support plate ($e_3$) connected to the surfaces of the expandable and retractable members ($b_3$) ($b_3$) has its surface provided along the rear surface of the expandable and retractable foaming material (F) of the side support (33) portion.

An air pipe (37') branched from the branch valve (36) is connected through a connecting pipe (28) to the air port (3) provided in one side edge of the main body (1) of the air bag.

Since the expandable and retractable members ($b_3$) ($b_3$) is constructed such that portions along one side edge of the main body (1) of the air bag are joined, when air is supplied to the expandable and retractable members ($b_3$) ($b_3$) to expand the main body (1) of the air bag, other side edges of the expandable and retractable members ($b_3$) ($b_3$) are opened and stretched so as to form a generally V-shape in section as shown in FIG. 62 whereby the support plate ($e_3$) connected to the surfaces of the expandable and retractable members ($b_3$) ($b_3$) is projected so as to increase an angle of inclination toward the central portion of the seat surface and inflate the surface of the side support (33) as well.

As shown in FIG. 61, the support plate ($e_4$) of the side support (34) o the side of the seat back (B) is connected to the expandable and retractable members ($b_4$) ($b_4$) through an operating mechanism (j).

The operating mechanism (j) is constructed such that a support shaft (18) is mounted between shaft carriers (20) (20) erected toward the central portion of the seat from bearing plates (19) (19) on both sides of the supporting shaft (G), and an arm plate (21) is pivotally supported by the support shaft (18). The support plate ($e_4$) adjusted to the curved surface of the side support (34) is fixedly mounted on the inner side at the extreme end of the arm plate (21) in the state wherein the support plate ($e_4$) is applied to the rear surface of the expandable and retractable foaming material (F) of the side supports (34) (34).

Furthermore, the expandable and retractable members ($b_4$) ($b_4$) are placed between the rear end of the arm plate (21) and the fixed surfaces (22a) (22a) of fixing members (22) (22) projected in the shape of L from the bearing plates (19) (19) toward the central portion of the seat, the mounting lugs (23) (23) projected from both ends of the main body (1) of the air bag on the sides of the fixed surfaces (22a) (22a) are secured to the fixed surfaces (22a) (22a) by means of fittings (12), and the supporting lug (19) projected from both ends of the main body (1) of the air bag on the side of the arm plate (21) is secured to the rear surface of the support plate by means of the fittings (12).

The expandable and retractable members ($b_4$) ($b_4$) are constructed such that three air-bag main bodies (1) are placed one above another, the central portions in the contacted surface of the main bodies (1) are thermally melted and adhered to join each of the main bodies (1) of the air bags together, air through-pass holes ($i_4$) ($i_4$) to provide a communication between the air chambers ($h_4$) ($h_4'$) and ($h_4''$) of the main body (1) of the air bag are bored in the area of the joined location, an air port (24) is formed in the main body (1) of the air bag on the side of the fixed surface (22a), and an air pipe (37') branched from the branch valve (36) is connected to the air port (24) through a connecting pipe (28).

When air is supplied to the expandable and retractable members ($b_4$) ($b_4$) of the side support (34) to expand each of the main bodies (1) of the air bags and expand the expandable and retractable members ($b_4$) ($b_4$), the rear end of the arm plate (21) is urged outwardly to turn the arm plate (21). Then, the support plate ($e_4$) provided at the extreme end of the arm plate (21) pivots around the support shaft (18) toward the central portion of the seat to thereby inflate the surface of the side support (34).

The expandable and retractable member ($b_2$) and support plate ($e_2$) in the lumbar support (32) have the same construction as the expandable and retractable member ($b_1$) and support plate ($e_1$) in the thigh support (31), wherein as shown in FIG. 60, the expandable and retractable member ($b_2$) composed of two main bodies (1) of the air bags is fixedly mounted on the back rest base plate (25) provided between both bearing plates (19) (19) of the supporting frame (G), the support plate ($e_2$) adjusted to the curved surface of the lumbar support (32) is connected to the surface of the expandable and retractable member ($b_2$) by means of screws or fittings (12), whereby air is supplied from the air through-pass hole (26) into the expandable and retractable member ($b_2$) to expand the expandable and retractable member ($b_2$) and project the support plate ($e_2$) toward the surface of the lumbar support (32) thereby inflating the surface of the lumbar support (32).

Also, the expandable member ($b_5$) and support plate ($e_5$) of the head support (35) have the same construction as the expandable and retractable members ($b_1$) ($b_2$) and support plates ($e_1$) ($e_2$) of the thigh support (31) and lumbar support (32) except that in the expandable and retractable member ($b_5$) of the head support (35), both longitudinal and lateral widths of the main body (1) of the air bag are widened so as to avoid deflections in all directions of the main bodies (1) of the air bags when supported, and the area of the joined surface of both the main bodies (1) of the air bags is formed into a wide square shape.

The support plate ($e_5$) is also formed largely and curved along the back of the head naturally, and when air is supplied into the expandable and retractable member ($b_5$) to inflate the surface of the head support (35), the back of the head of the user may be positively supported without deflection.

The branch valve (36) for distributing air fed from the air pump (a) to the expandable and retractable members ($b_1$) to ($b_5$) of the support portions (31) to (35), respectively, is provided with five branch flow passages (not shown) adapted to branch air through-pass passages (not shown) in communication with the air pump (a) through an air pipe (37), said branch flow passages each being provided with a three-way valve (not shown) adapted to open and close the flow passage to discharge air in said flow passage outside. The opening and closing and discharging operations of the three-way valve are made by operating buttons ($k_1$) to ($k_5$). When the desired one of the support portions (31) to (35) is inflated, the operating buttons ($k_1$) to ($k_5$) of the support portions (31) to (35) are set to their open position to supply the air fed from the air pump (a) to the expandable and retractable members ($b_1$) to ($b_5$) of the support portions passing through the air pipes (37') connected to the branch passages, respectively.

When the suitable support surface is inflated and supported in the desired state, the operating buttons ($k_1$) to ($k_5$) of the support portions are moved to their closed position to stop a supply of air.

When the support of the desired supports (31) to (35) portions are loosened or depressed so as to face to the surface of the other seat in the original state, the operating buttons ($k_1$) to ($k_5$) of the support portions are moved to the discharging position, and air within the expandable and retractable members ($b_1$) to ($b_5$) of the support portions is discharged outside from the branch passages in communication with the expandable and retractable members ($b_1$) to ($b_5$).

The branch valve (36) is located on the side of the air cushion (A) so that the user may access thereto along with the operating switch (27) and the like.

While in the above-mentioned air support device, seven sets of the expandable and retractable members (b) and support plates (e) have been used, it is to be noted that more than one set of the expandable and retractable members (b) and support plates (e) could be used as desired and also their installing locations could be optional as long as they are located on the seat surface. However, in the case where plural sets of the expandable and retractable members (b) and support plates (e) are provided, air from the air pump (a) need be supplied to the suitable expandable and retractable member (b), and therefore, the branch valve (36) used in the air support device is required.

For connecting the support plate (e) to the expandable and retractable member (b), it may be directly connected to the surface of the expandable and retractable member (b) as in the supports (31), (32), (33) and (35) of the support device or may be connected through the operating mechanism (j) as in the side support (34), which can be selected according to the need of design.

What is claimed is:

1. A vehicle seat assembly which comprises
   a seat cushion which provides an upper surface on which a user sits, said upper surface having a contour,
   an inflatable bag device positioned within said seat cushion, said inflatable bag device comprising first and second generally rectangular outer fabric members which are in direct sealing contact with one another along only peripheries thereof, a rib fabric member connected between said first and second outer fabric members inwardly of said peripheries thereof, each said first and second fabric member being made of a laminated sheet member consisting of a meshed middle fabric layer sandwiched between two thermoplastic synthetic resin layers, the two layers being adhered to each other through the meshes of the middle layer,
   an air port sealingly connected to one of said first and second outer fabric members, and
   a pipe means connected to said air port to enable air to be supplied to or removed from said inflatable bag device, thereby changing the contour of said upper surface of said seat cushion.

2. A vehicle seat assembly according to claim 1, wherein said inflatable bag device comprises a plurality of rib fabric members connected between said first and second outer fabric members.

3. A vehicle seat assembly according to claim 1, including a plurality of pipe means, and wherein said inflatable bag device comprises a plurality of air ports sealingly connected in one of said first and second outer fabric members, a respective pipe means being connected to a respective air port.

4. A vehicle seat assembly according to claim 1, wherein said middle fabric layer of each of said first and second fabric members is a woven fabric which has 70 to 200 meshes and which is made of yarns which have a coarseness of 50 to 100 microns which display non-expandable and retractable properties and which have high strength.

5. A vehicle seat assembly according to claim 1, wherein said rib fabric member has a tubular shape, and wherein said rib fabric member is connected to said first outer fabric member along two parallel lines and to said second outer fabric member along two parallel lines.

6. A vehicle seat assembly which comprises
   a seat back which provides a front surface against which a user leans, said front surface having a contour,
   an inflatable bag device positioned within said seat back, said inflatable bag device comprising first and second generally rectangular outer fabric members which are in direct sealing contact with one another along only peripheries thereof, a rib fabric member connected between said first and second outer fabric members inwardly of said peripheries thereof, each said first and second fabric member being made of a laminated sheet member consisting of a meshed middle fabric layer sandwiched between two thermoplastic synthetic resin layers, the two layers being adhered to one another through the meshes of the middle layer,
   an air port sealingly connected to one of said first and second outer fabric members, and
   a pipe means connected to said air port to enable air to be supplied to or removed from said inflatable bag device, thereby changing the contour of said front surface of said seat back.

7. A vehicle seat assembly according to claim 6, wherein said inflatable bag device comprises a plurality of rib fabric members connected between said first and second outer fabric members.

8. A vehicle seat assembly according to claim 6, including a plurality of pipe means, and wherein said inflatable bag device comprises a plurality of air ports sealingly connected in one of said first and second outer fabric members, a respective pipe means being connected to a respective air port.

9. A vehicle seat assembly according to claim 6, wherein said said middle fabric layer of each of said first and second fabric members is a woven fabric which has 70 to 200 meshes and which is made of yarns which have a coarseness of 50 to 100 microns which display non-expandable and retractable properties and which have high strength.

10. A vehicle seat assembly according to claim 6, wherein said rib fabric member has a tubular shape, and wherein said rib fabric member is connected to said first outer fabric member along two parallel lines and to said second outer fabric member along two parallel lines.

11. A vehicle seat assembly which comprises
a seat cushion which provides an upper surface on which a user sits, said upper surface having a contour,
an expandable and retractable mechanism positioned within said seat cushion, said expandable and retractable mechanism comprising a plurality of inflatable bag devices which are each formed of first and second generally rectangular outer fabric members that are sealingly connected together along peripheries thereof, thereby providing interior chambers therein, each of said first and second generally rectangular outer fabric member being made of laminated sheet members consisting of a meshed middle fabric layer sandwiched between two thermoplastic synthetic resin layers, the two layers being adhered to one another through the meshes of the middle layer, said plurality of inflatable bag devices being connected together so as to form a stack and including openings in at least one of the first and second outer fabric members thereof, each opening of each inflatable bag device being in register with an opening in another inflatable bag device so as to provide communication between said interior chambers therein, and an air port means sealingly connected to one of said inflatable bag devices,
a support plate located in said seat cushion between said upper surface of said seat cushion and said expandable and retractable mechanism therein,
an air pump, and
a pipe means connecting said air pump with said air port of said expandable and retractable mechanism to enable air to be supplied to or removed therefrom and thus control the movement of said support plate within said seat cushion and thereby change the contour of said upper surface of said seat cushion.

12. A vehicle seat assembly according to claim 11, wherein said inflatable bag device contains permeable urethane foam.

13. A vehicle seat assembly according to claim 11, wherein said inflatable bag device comprises a plurality of rib fabric members connected between said first and second outer fabric members.

14. A vehicle seat assembly according to claim 11, including a plurality of pipe means, and wherein said inflatable bag device comprises a plurality of air ports sealingly connected in one of said first and second outer fabric members, a respective pipe means being connected to a respective air port.

15. A vehicle seat assembly according to claim 11, wherein said middle fabric layer of each of said first and second fabric members is a woven fabric which has 70 to 200 meshes and which is made of yarns which have a coarseness of 50 to 100 microns which display non-expandable and retractable properties and which have high strength.

16. A vehicle seat assembly according to claim 11 further comprising a rib fabric member connected between said first and second outer fabric members inwardly of said peripheries thereof.

17. A vehicle seat assembly according to claim 16, wherein said first and second outer fabric members and said rib fabric member of said inflatable bag device are made of tarpaulin.

18. A vehicle seat assembly according to claim 16, wherein said rib fabric member has a tubular shape, and wherein said rib fabric member is connected to said first outer fabric member along two parallel lines and to said second outer fabric member along two parallel lines.

19. A vehicle seat assembly which comprises
a seat back which provides a front surface against which a user sits, said front surface having a contour,
an expandable and retractable mechanism positioned within said seat back, said expandable and retractable mechanism comprising a plurality of inflatable bag devices which are each formed of first and second generally rectangular outer fabric members that are sealingly connected together along peripheries thereof, thereby providing interior chambers therein, each of said first and second generally rectangular outer fabric members being made of laminated sheet members consisting of a meshed middle fabric layer sandwiched between two thermoplastic synthetic resin layers, the two layers being adhered to one another through the meshes of the middle layer, said plurality of inflatable bag devices being connected together so as to form a stack and including openings in at least one of the first and second outer fabric members thereof, each opening of said inflatable bag device being in register with an opening in another inflatable bag device so as to provide communication between said interior chambers therein, and an air port means sealingly connected to one of said inflatable bag devices,
a support plate located in said seat back between said front surface of said seat cushion and said expandable and retractable mechanism therein,
an air pump, and
a pipe means connecting said air pump with said air port of said expandable and retractable mechanism to enable air to be supplied to or removed therefrom and thus control the movement of said support plate within said seat back and thereby change the contour of said front surface of said seat back.

20. A vehicle seat assembly according to claim 19, wherein said inflatable bag device contains permeable urethane foam.

21. A vehicle seat assembly according to claim 19, wherein said inflatable bag device comprises a plurality of rib fabric members connected between said first and second outer fabric members.

22. A vehicle seat assembly according to claim 19, including a plurality of pipe means, and wherein said inflatable bag device comprises a plurality of air ports sealingly connected in one of said first and second outer fabric members, a respective pipe means being connected to a respective air port.

23. A vehicle seat assembly according to claim 19, wherein said middle fabric layer of each of said first and second fabric members is a woven fabric which has 70 to 200 meshes and which is made of yarns which have a coarseness of 50 to 100 microns which display non-expandable and retractable properties and which have high strength.

24. A vehicle seat assembly according to claim 19 further comprising a rib fabric member connected between said first and second outer fabric members inwardly of said peripheries thereof.

25. A vehicle seat assembly according to claim 24, wherein the first and second outer fabric members and said rib fabric member of said inflatable bag device are made of tarpaulin.

26. A vehicle seat assembly according claim 24, wherein said rib fabric member has a tubular shape, and wherein said rib fabric member is connected to said first outer fabric member along two parallel lines and to said second outer fabric member along two parallel lines.

* * * * *